United States Patent
Roth et al.

(10) Patent No.: US 9,442,752 B1
(45) Date of Patent: Sep. 13, 2016

(54) VIRTUAL SECURE EXECUTION ENVIRONMENTS

(71) Applicant: Amazon Technologies, Inc., Reno, NV (US)

(72) Inventors: Gregory Branchek Roth, Seattle, WA (US); Aaron Douglas Dokey, Seattle, WA (US); Eric Jason Brandwine, Haymarket, VA (US); Nathan Bartholomew Thomas, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 30 days.

(21) Appl. No.: 14/476,520

(22) Filed: Sep. 3, 2014

(51) Int. Cl.
*G06F 21/00* (2013.01)
*G06F 9/455* (2006.01)
*G06F 21/53* (2013.01)

(52) U.S. Cl.
CPC ........... *G06F 9/45558* (2013.01); *G06F 21/53* (2013.01); *G06F 2009/45587* (2013.01)

(58) Field of Classification Search
CPC ...................................................... G06F 21/53
See application file for complete search history.

(56) References Cited

U.S. PATENT DOCUMENTS

| | | |
|---|---|---|
| 4,218,582 A | 8/1980 | Hellman et al. |
| 4,405,829 A | 9/1983 | Rivest et al. |
| 5,643,085 A | 7/1997 | Aityan et al. |
| 5,643,086 A | 7/1997 | Alcorn et al. |
| 5,848,159 A | 12/1998 | Collins |
| 5,867,578 A | 2/1999 | Brickell et al. |
| 5,905,799 A | 5/1999 | Ganesan |
| 6,071,190 A | 6/2000 | Weiss et al. |
| 6,237,097 B1 | 5/2001 | Frankel et al. |
| 6,364,796 B1 | 4/2002 | Nakamura et al. |
| 6,722,986 B1 | 4/2004 | Lyons et al. |
| 7,063,615 B2 | 6/2006 | Alcorn et al. |
| 7,917,747 B2 | 3/2011 | Wolf |
| 8,407,584 B1 * | 3/2013 | Boodman ............... G06F 21/53 715/234 |
| 9,116,733 B2 | 8/2015 | Banga et al. |
| 2004/0176068 A1 | 9/2004 | Paatero |
| 2005/0091535 A1 | 4/2005 | Kavalam et al. |
| 2006/0161887 A1 * | 7/2006 | Krishnaswamy ....... G06F 9/468 717/106 |
| 2007/0050763 A1 * | 3/2007 | Kagan ................. G06F 9/45558 718/1 |
| 2007/0153715 A1 * | 7/2007 | Covington ............. G06F 21/57 370/315 |
| 2007/0206799 A1 | 9/2007 | Wingert et al. |
| 2008/0216071 A1 | 9/2008 | Gidalov |

(Continued)

FOREIGN PATENT DOCUMENTS

WO    WO2008118648    10/2008

OTHER PUBLICATIONS

McKeen, Frank et al., "Innovative Instructions and Software Model for Isolated Execution", pp. 1-8, Intel Corporation, 2013.

(Continued)

*Primary Examiner* — Izunna Okeke
*Assistant Examiner* — Ali Shayanfar
(74) *Attorney, Agent, or Firm* — Davis Wright Tremaine LLP

(57) ABSTRACT

A method and system for running an additional execution environment associated with a primary execution environment, receiving a request from the primary execution environment to create the additional execution environment, and, in response to the request, creating the additional execution environment such that entities other than the primary execution environment have insufficient privileges to access the additional execution environment.

27 Claims, 9 Drawing Sheets

(56) References Cited

U.S. PATENT DOCUMENTS

| | | | |
|---|---|---|---|
| 2009/0313406 A1* | 12/2009 | Suh | G06F 9/5055 710/73 |
| 2010/0031325 A1* | 2/2010 | Maigne | G06F 9/45533 726/4 |
| 2010/0077473 A1* | 3/2010 | Ohta | G06F 21/53 726/17 |
| 2012/0084838 A1 | 4/2012 | Inforzato et al. | |
| 2012/0144457 A1 | 6/2012 | Counterman | |
| 2012/0159184 A1 | 6/2012 | Johnson et al. | |
| 2012/0192177 A1* | 7/2012 | Tsirkin | G06F 9/45558 718/1 |
| 2013/0117561 A1 | 5/2013 | Chawla et al. | |
| 2013/0151846 A1 | 6/2013 | Baumann et al. | |
| 2013/0174150 A1* | 7/2013 | Nakajima | G06F 9/45558 718/1 |
| 2013/0174151 A1* | 7/2013 | Nakajima | G06F 9/461 718/1 |
| 2013/0179682 A1 | 7/2013 | Ramachandran et al. | |
| 2013/0198853 A1 | 8/2013 | Mckeen et al. | |
| 2013/0227286 A1* | 8/2013 | Brisson | H04L 63/062 713/168 |
| 2013/0282776 A1* | 10/2013 | Durrant | G06F 17/30115 707/827 |
| 2013/0312117 A1 | 11/2013 | Sapp, II et al. | |
| 2013/0326504 A1* | 12/2013 | Tsirkin | G06F 9/455 718/1 |
| 2014/0105393 A1 | 4/2014 | Kolesnikov | |
| 2014/0181359 A1* | 6/2014 | Zhang | G06F 11/1484 711/6 |
| 2014/0201841 A1 | 7/2014 | Deshpande et al. | |
| 2014/0223543 A1* | 8/2014 | Jeansonne | G06F 21/53 726/16 |
| 2014/0325515 A1* | 10/2014 | Salmela | G06F 9/45533 718/1 |
| 2014/0331317 A1 | 11/2014 | Singh | |
| 2014/0351583 A1* | 11/2014 | Bettale | H04W 12/04 713/159 |
| 2014/0373012 A1* | 12/2014 | Ylitalo | H04W 4/003 718/1 |
| 2015/0007175 A1* | 1/2015 | Potlapally | G06F 21/57 718/1 |
| 2015/0058629 A1 | 2/2015 | Yarvis et al. | |
| 2015/0143347 A1 | 5/2015 | Jones et al. | |
| 2015/0143375 A1* | 5/2015 | Bruso | G06F 9/45533 718/101 |
| 2015/0199509 A1 | 7/2015 | Wille | |
| 2015/0200948 A1 | 7/2015 | Cairns et al. | |
| 2015/0244716 A1 | 8/2015 | Potlapally et al. | |
| 2015/0254451 A1 | 9/2015 | Doane et al. | |

OTHER PUBLICATIONS

Intel SGX for Dummies—Part 1 (Intel SGX Design Objectives), pp. 1-4, Sep. 26, 2013, Intel Corporation.

Intel SGX for Dummies—Part 2, pp. 1-3, Jun. 2, 2014, Intel Corporation.

Intel SGX for Dummies—Part 3, pp. 1-3, Sep. 1, 2014, Intel Corporation.

Software Guard Extensions Programming Reference, 2010-2013, Intel Corporation.

Goldreich et al., "How to Play Any Mental Game," In Proceedings of the Nineteenth Annual ACM Symposium on Theory of Computing (STOC '87), Alfred V. Aho (Ed.). ACM, New York, NY, USA, pp. 218-229, 1987.

\* cited by examiner

VIRTUAL SECURE EXECUTION ENVIRONMENTS

BACKGROUND

Modern computer systems place a high importance on maintaining data and application security. In a modern distributed and/or virtual computer system environment where users, services, applications, virtual machines, controlling domains and hosts have access to a computer system, maintaining data and application security may be a difficult problem. In a distributed and/or virtual computer system environment, for example where the computer system resources may be provided by a computing resource service provider, customers may also wish for additional security for sensitive or restricted data.

Encrypting data or applications may help ameliorate the security risks, but users often desire additional assurances. For example, users may desire additional assurances that malicious applications will be unable to temporarily obtain trusted status on a host machine, thus gaining access to the encryption keys and thus compromising the encryption security. Accordingly, users may desire assurances of the security of data and applications operating within a computing resource service provider.

BRIEF DESCRIPTION OF THE DRAWINGS

Various embodiments in accordance with the present disclosure will be described with reference to the drawings, in which.

DETAILED DESCRIPTION

Figure 1:
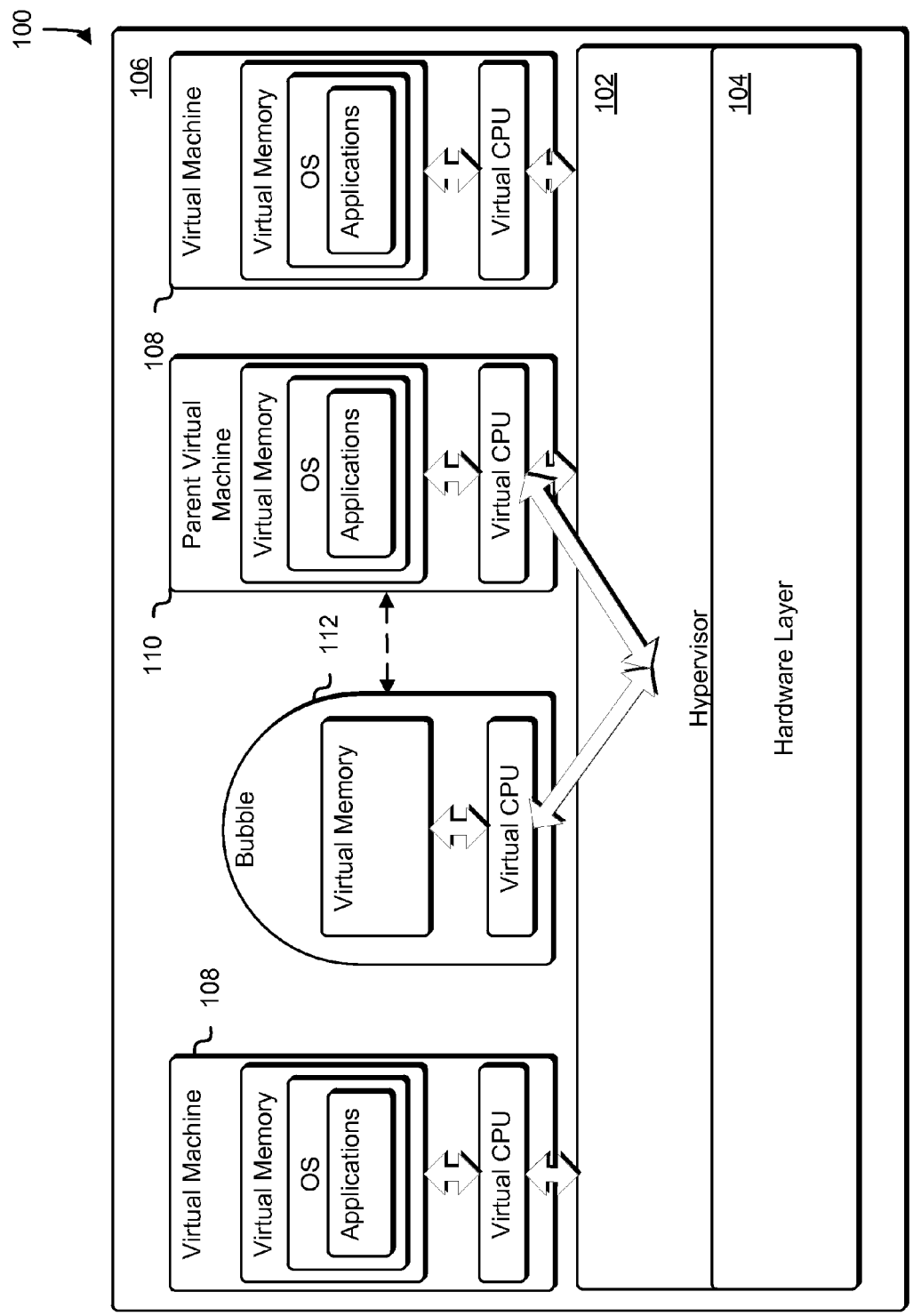
FIG. 1 illustrates an example of a bubble in a virtual machine environment in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested include systems, processes and methods for configuring and controlling access to secured data regions by users of distributed and/or virtual computer systems, such as those provided by a computing resource service provider. In some examples, a service provider enables customers of the service provider to secure sensitive data and any applications configured to access the data. Customers may submit requests to the service provider that the service provider fulfills by instantiating secure execution environments (referred to as "bubbles") for the customers. The secure execution environments allow for the execution of code and access to data in an environment that prevents access to data from unauthorized entities.

A bubble is a special purpose execution environment, such as a virtual machine instance or execution sandbox, for securely executing code and/or securing data. The bubble has a basic set of resources, such as memory and a virtual or real processor, as is essential to perform specific tasks required of the bubble. The bubble is associated with, and often created, by a parent virtual machine instance of a customer and, in some embodiments, only communicates with the parent virtual machine instance and a virtualization layer, such as a hypervisor. In some embodiments, the bubble may be operated as a virtual co-processor within a virtual machine which has separate memory and some manner of communicating with the parent virtual machine. Communication between the bubble and the parent virtual machine instance or the bubble and the virtualization layer may be secured, such as through the use of trusted asymmetrical cryptographic keys or by requiring communication with the bubble to be authenticated by the virtualization layer, thus ensuring that the data may not be tampered with or understood by unauthorized entities. Once the bubble completes its designated tasks, the bubble may remain idle until further instructions are received, be deprovisioned, be suspended for later use or may be reassigned to a different virtual machine instance. The bubble may or may not have a fully-functional operating system such as, for example, by lacking one or more peripheral devices that the parent has.

Users may be provided functions and/or interfaces to create bubbles, deprovision bubbles, send messages and/or instructions and/or data to bubbles, generate cryptographic keys for use with bubbles, receive messages and/or data from bubbles, and other functions. Access to such functionality may be provided by a library, interface, web service, application programming interface or other access methodology. A computing resource service provider may provide access to the interface to a user of a computer system as a service. Note that providers of bubble services, bubble functionality, and methods of providing access to bubbles are merely illustrative, and, as such, other providers of bubble services, bubble functionality, and methods of providing access to bubbles may be considered as within the scope of the present disclosure.

FIG. 1 illustrates an aspect of a host computer 100 in which various embodiments of the present disclosure may be practiced. As illustrated in FIG. 1, the host computer 100 may include a hypervisor 102 controlling access between a hardware layer 104 of a server 106 and virtual machines 108 and 110. The hardware layer 104 may include the physical components of a computing device or equipment, such as a computer or server similar to the client device 902 and the application server 908 described in conjunction with FIG. 9. Examples of servers 106 having such a hardware layer 104 described above include data servers and other servers including web server 906 and application server 908 described in FIG. 9. The servers 106 illustrated in the host computer 100 may be an individual server hosting the virtual machines 108 and 110 or may be distributed computer system as described in FIG. 9 hosting the virtual machines 108 and 110.

A bubble may be a special purpose execution environment, such as a virtual machine instance supported by the hypervisor 102, for securely executing code and/or securing data, which the bubble is coupled to a primary execution environment (e.g., a parent virtual machine instance) of a computing resource service provider. As illustrated by the host computer 100, the parent virtual machine 110 is communicatively coupled to a bubble 112, such that the bubble 112 and the parent virtual machine 110 may communicate by utilizing the hypervisor 102 to pass messages between each other. In some embodiments the bubble 112 and the parent virtual machine 110 are located on separate servers and communicatively coupled through a network. In some cases of this embodiment, the separate servers may be servers in a data center, whereas in other cases the separate servers may be located in different data centers in different geographic regions.

The bubble 112 may have become attached to the parent virtual machine 110 as a result of a variety of different events, such as by a call to an application programming interface, an executable instruction to an instance metadata service, or a processor instruction being trapped by the hypervisor 102. As a result of such call or instructions, the bubble 112 may have been created, or the bubble 112 may have been an existing idle bubble which subsequently becomes attached to the parent virtual machine 110 by the hypervisor 102, or the bubble 112 may have been previously created by the parent virtual machine 110, suspended, and released from suspension.

Like a standard virtual machine, the bubble 112 generally has a virtual processor and virtual memory. In some, but not all cases, the bubble 112 may not have an operating system. The bubble 112 may be configured to instantiate a bootloader and/or receive instructions from the parent virtual machine 110. As described herein, the virtual processor of the bubble 112 may be configured to process operations using an allocated percentage of processor scheduled time of the parent virtual machine 110 virtual processor. Alternately or additionally, the virtual processor of the bubble 112 may utilize unused processor cycles of the physical processor of the server 106 for processing.

In some embodiments, the bubble 112 may have access to materials, devices and/or resources that the parent virtual machine 110 may not have access to. For example, where the hardware layer 104 of the server 106 supports Intel® Software Guard eXtensions (SGX), the bubble 112 may be able to utilize such Intel® SGX technology, whereas a parent virtual machine 110 may not be operating under a service plan that allows access to an enclave provided using the SGX technology. Similarly, although separate from the parent virtual machine 110, the bubble 112 may retain access to materials, devices and/or resources available to the parent virtual machine 110. For example, if the parent virtual machine 110 has, as a part of the service plan of the customer owning the parent virtual machine, access to block-level data storage services and/or on-demand data storage services, in some cases, the bubble 112 may have access to one or more of the same block-level data storage services and/or on-demand data storage services as the parent virtual machine.

A host computer system may be configured to host bubbles in various ways. For example, as illustrated in FIG. 1, there may be a hypervisor executing on the host computer and the hypervisor may control one or more virtual machine instances also executing on the host computer system, one or more of the virtual machine instances being a bubble. In other examples, a container (e.g., a Solaris Zone, Parallels Virtuozzo Container, or LinuX Container) may be utilized to host the bubble on the host computer system. Similarly, an entity executing on the host computer system, such as the host operating system, a service executing under the control of the host operating system, the controlling domain, a service executing under control of the controlling domain, a guest operating system executing on a virtual machine instance, or a service executing in a virtual machine instance may provide an interface to the bubble. In this manner, a user, client, service or other entity with access to a virtual machine instance on the host computer system may use that interface to, for example, create a bubble, send instructions to the bubble, generate cryptographic keys for the bubble and/or other operations.

A bubble may take the form of a virtual machine on the same or different host computer as its parent virtual machine, an enclave in a container, such as a Solaris Zone, Parallels Virtuozzo Container, or LinuX Container, on the same or different physical machine as the parent virtual machine, a container in an enclave on the same or different physical machine as the parent virtual machine, or a virtual machine in an enclave on the same or different physical machine as the parent virtual machine.

An enclave is a protected area in memory address space of a computer system that provides confidentiality and integrity for applications and data within the protected area. The enclave operates as a secure execution environment; that is, the enclave prevents applications external to the enclave, even privileged applications such as virtualization monitors, basic input/output systems, operating systems, and even other enclaves, from accessing the enclave memory address space, but applications executing within the enclave may access executable instructions and data internal to the enclave. The enclave prevents access to unencrypted enclave data (i.e., data resident within the enclave) by applications external to the enclave, and when the data is written to the memory address space, the data is automatically encrypted. Additionally, information exiting the enclave may be cleansed of data referring to the enclave's protected memory addresses to prevent external software from determining the location of enclave-protected data in memory.

Enclave functionality may be provided to a system through software, such as under the control of a hypervisor or a kernel of an operating system that allows virtualized user space instances, or through hardware by a specialized instruction set, such as Intel® Software Guard eXtensions (SGX), a module such as a trusted platform module (TPM), system microcode or combinations of these. Enclave functionality allows programmatic instantiation of an enclave, which may comprise initializing of an enclave control structure, allocating enclave memory, loading of enclave contents (e.g., applications and/or data loaded into the enclave) into the enclave memory, measuring of the enclave contents, and establishing an enclave identity. Enclave functionality may also include the ability to protect applications and/or data within the enclave from malicious software attacks, by detecting of integrity violations of protected applications and/or data and preventing access to protected applications and/or data that fail integrity checks.

A characteristic of an enclave is an ability to provide remote attestation as to the state of the enclave. For example, the enclave may have a set of functions that, when executed by a processor, provide a measurement indicating the current state of executable code and/or data within the enclave. Another characteristic of an enclave is that it has a root of trust separate and protected from outside entities. That is, the enclave may have cryptographic keys resident within the enclave for digitally signing data output from the enclave, and, by verifying the digital signature, applications external to the enclave may be configured to trust the output data.

Enclave functionality may include functionality for creating, deprovisioning, measuring (i.e., gathering metrics from), and populating enclaves. Enclave functionality may further include generating keys, sending and receiving data. Access to such enclave functionality may be provided by a code library, an interface, web service, or application programming interface. In response to receiving a request through one of the methods of accessing enclave functionality, the computing resource service provider may provide that access to a user of a computer system as described herein. Note that the providers of enclave functionality, the types of enclave functionality, and the methods of providing access to enclave functionality described herein are for illustrative purposes and, as such, other providers of enclave functionality, types of enclave functionality and methods of providing access to enclave functionality as would be contemplated by a person having ordinary skill in the art may be considered as within the scope of the present disclosure.

In some embodiments, upon instantiation or upon request, instructions executed within the enclave by a processor may generate a set of cryptographic keys for encrypting, decrypting, and performing integrity validation of data passing between the enclave and another entity. In some cases, the set of cryptographic keys may be a key-pair based on an asymmetrical public-private cryptographic scheme, and instructions executed within the enclave by a processor may provide the public key of the key-pair to a trusted entity and retain the private key of the key-pair securely within the enclave where it may not be accessible to outside entities. Subsequently, the trusted entity may encrypt data and/or instructions using the public key and provide the encrypted data and/or instructions to the enclave, whereupon instructions executed within the enclave by a processor may decrypt the data and/or instructions using the private key held within the enclave. Alternately or additionally, instructions executed within the enclave by a processor may digitally sign results of processing or execution using the private key within the enclave to provide assurance to the trusted entity the output has not been tampered with or forged.

In other embodiments usable in combination with other embodiments, the trusted entity may generate a set of cryptographic keys for encrypting, decrypting, and performing integrity validation of data passing between the enclave and another entity. In some cases, the set of cryptographic keys may be a key-pair based on an asymmetrical public-private cryptographic scheme, and the trusted entity may provide the public key of the key-pair to the enclave and retain the private key of the key pair. Subsequently, instructions executed within the enclave by a processor may encrypt data and/or results of processing or execution using the public key before providing the data and/or results to the trusted entity, whereupon the trusted entity may decrypt the encrypted data and/or results using its private key. Alternately or additionally, the trusted entity may digitally sign data and/or instructions provided to the enclave using the private key of the trusted entity to provide assurance to the enclave that the data and/or instructions have not been tampered with or forged. Alternately or additionally, in a technique referred to herein as enveloping, instructions executed within the enclave by a processor may provide the trusted entity with a session key encrypted using the public key of the trusted entity. Subsequently, instructions executed within the enclave by a processor may provide encrypted data and/or results of processing of execution, whereupon the trusted entity may decrypt the encrypted data and/or results using the session key.

A computer system for hosting enclaves may be a distributed system with hosts, may be a single system with virtual machine instances or may be a networked combination of systems. A computer system may provide access to users, customers, modules, applications, services, processes, programs, operating systems and controlling domains. Some of the access provided by the computer system to these entities may include providing access to confidential data and/or privileged applications. A computer system may also provide data storage regions to the customer, including memory, disk storage, virtual memory and virtual disk storage. Consequentially, some of the data storage regions provided by the computer system may be configured to store confidential and/or otherwise significant data.

A computer system for hosting enclaves may also host applications, processes, and services configured to access and/or manipulate such confidential data. A computer system may also run applications from a computing resource service provider that may utilize privileged code or perform operations on confidential data. Additionally, a computer system may include operating systems, privileged users, and controlling domains which may have full access to the computer system resources, including direct access to computer memory, CPUs, data storage, network and/or other computer system resources. A customer may wish to secure confidential data, and any applications configured to access such confidential data, by preventing access to the data and/or applications by entities without proper credentials, even those entities that are typically trusted entities such as operating systems, privileged users, and controlling domains. Similarly, a computing resource service provider may also wish to secure such confidential data and any Applications configured to access the confidential data by preventing access to the confidential data and Applications by any entity without proper credentials.

A computer system of a computing resource service provider may be configured to support a virtualization layer to provide computational resources upon which virtual machines may operate. The virtualization layer may manage memory and processor scheduling for all virtual machines operating on the computer system. The virtualization layer may also launch and/or manage a control domain, also known as a privileged domain, which is a virtual machine having direct access to the hardware of the computer system. The virtualization layer may be any device, software or firmware, used for providing a virtual computing platform for the virtual machines. The virtual machines of the virtualization layer may be provided to customers of the computing resource service provider, and the customers may run an operating system and/or applications on the virtual machines of the customer. An example of a virtualization layer includes a hypervisor.

An entity, such as one or more of a service or operating system running on the computer system, the controlling domain, a guest domain running a virtual machine instance, or a service or operating system of the controlling domain or a guest domain, may provide an interface to enclave functionality. A user (e.g., a person operating a device running applications) with access to a virtual machine instance on the computer system may use that interface to the enclave functionality to, for example, create an enclave, populate the enclave and obtain keys.

In an illustrative example, a computer system may provide enclave functionality, as noted, via the SGX instruction set that may be enabled on the CPU of the computer system, although the scope of the present disclosure extends to other enclaves. The physical hardware of the computer system may be any device or equipment configured to execute instructions for performing data computation, manipulation or storage tasks, such as a computer or server. The computer system may be equipped with processors, including a CPU, a graphics processing unit (GPU), and a digital signal processor (DSP). The computer system may further include memory, including static and dynamic volatile memory, and non-volatile persistent storage such as optical and magnetic storage disks, tape, and flash memory. The computer system may also include additional hardware such as buses, input/output ports, and networking equipment compliant with any handshaking, communications or data transfer protocol.

As noted, a host computer system may provide enclave functionality through instructions made to the processors configured to support a secure execution environment, such as SGX, TPM or a virtualization component configured to support management of secure execution environments. The enclave functionality may be provided to various other services running on the host computer system. For example, a virtual computer system service of a computing resource service provider running on the host computer system may provide enclave functionality to a virtual machine instance running under the control of the virtual computer system service. Similarly, other services including block-level data storage services, cryptography services, on-demand data storage services, archival storage services, authentication services, policy management services, billing services, and task services may also access the enclave functionality to provide that functionality to resources associated with those services. Enclave functionality may also be provided to customers of the computing resource service provider. For example, a user with access to a service and/or access to the resources served by that service may use enclave functionality to further secure data and/or applications associated with that service. In an illustrative example, a virtual computer system service as described herein and/or a virtual machine instance associated with that virtual computer system service may use the enclave functionality to create an enclave, populate the enclave with data and/or applications, obtain keys for decrypting results from the enclave, start the applications within the enclave and receive updates.

The measurements may indicate a current state of the enclave and/or contents within the enclave. The measurements may be evaluated within the enclave or may be sent outside the enclave. Enclaves may be configured such that measurements are performed entirely within a secure portion of the processors and may also be configured so that the measurements are signed by secret materials provided by the processors, such as, for example, microcode running on the processors or a private key. In this way, measurements may be verified as correct by trusted users using the functionality provided with the enclave. Measurements may be verified by, for example, an application programming interface which may provide information usable to determine the state of the processors.

The measurements may be based in part on measurements obtained from host computer system hardware, such as, for example, measurements obtained by utilizing SGX instructions supported by the processors of the host computer system. In order to obtain the measurement, the enclave may first need to be paused or frozen by halting the execution of applications running within the enclave and/or by placing the applications in a certain determined state. By pausing and/or freezing the applications and/or placing the applications in a determined state, external verification that the enclave and its contents have not been tampered with may be made by comparing the measurements with predicted values. Measurements may, in some embodiments, include verification and/or validation that the measurements were performed by a trusted, verified and/or validated source. For example, measurements performed by the processors executing the appropriate SGX instructions may be digitally signed by the processors and thus verified as coming from the particular processors. Likewise, measurements coming from a TPM may include a similar verifiable signature with the measurements as an assurance that the measurements were performed by the TPM and/or a process running thereon.

Figure 2:
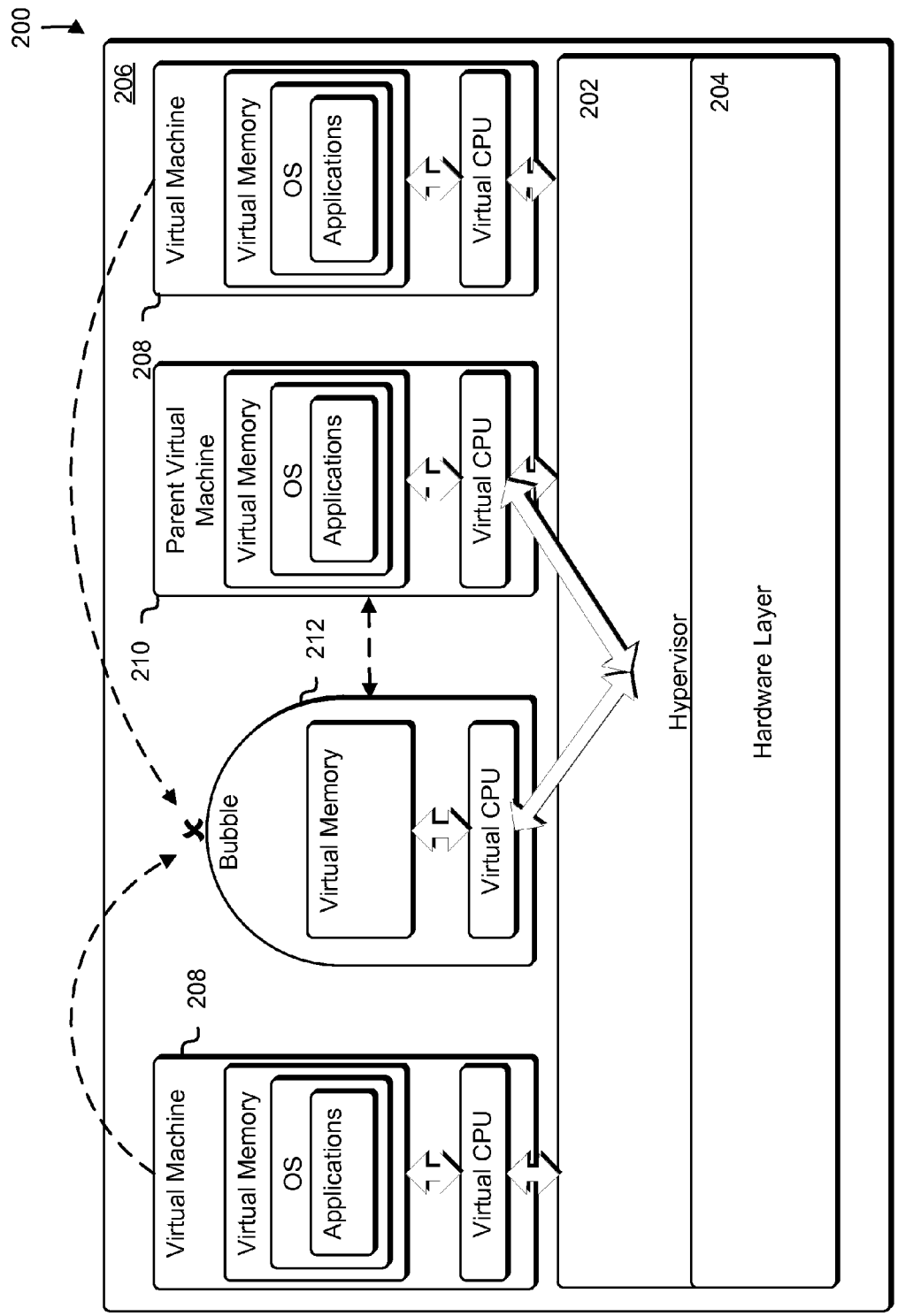
FIG. 2 illustrates an example of the isolation of a bubble in a virtual machine environment in accordance with an embodiment.

FIG. 2 illustrates an aspect of a host computer 200 in which an embodiment of the present disclosure may be practiced. Specifically, FIG. 2 depicts an host computer 200, similar to the host computer 100 of FIG. 1, having a hypervisor 202 between a hardware layer 204 of a server 206 hosting the virtual machines 208 and 210 and a bubble 212. FIG. 2 is intended to illustrate the isolation of the bubble 212 from virtual machines 208 hosted on the server 206 other than the parent virtual machine 210. As illustrated, while the parent virtual machine 210 is communicatively coupled to the bubble 212, the virtual machines 208 are prevented from accessing the bubble 212 of the parent virtual machine 210.

Access to the bubble 212 by entities other than the parent virtual machine 210 of the bubble may be prevented in a variety of ways. In some embodiments, the parent virtual machine 210 communicates with the bubble 212 through the hypervisor 202. In embodiments where the parent virtual machine 210 communicates with the bubble 212 through the hypervisor 202, the hypervisor 202 may control access to the bubble 212 such that unauthorized entities, such as virtual machines 208, do not have access to the bubble 212.

The bubble may be used as a secure environment for running sensitive code and/or performing operations on sensitive data (such as credit card data, medical records, etc.). Some embodiments may use public-private key encryption to ensure that communication between the bubble 212 and the parent virtual machine 210 may not be tampered with or forged. For example, the bubble 212 may hold a private key for decrypting message encrypted by a public key and the parent virtual machine 210 may hold the public key and may pass instructions to the bubble 212 by encrypting the instructions with the public key. In some embodiments, the parent virtual machine 210 may communicate directly with the bubble 212. In other embodiments, the bubble 212 and parent virtual machine 210 each have a symmetric key usable to encrypt and decrypt messages to and from each other. In some embodiments, the bubble 212 and the parent virtual machine 210 communicate with each other by reading and writing to a message-passing application protocol interface or other character-passing device. In some other embodiments, the bubble 212 and the parent virtual machine 210 communicate with each other by leaving messages in a region of memory shared by both the bubble 212 and the parent virtual machine 210. In some embodiments usable in combination with other embodiments, the bubble 212 and the parent virtual machine 210 communicate with each other by leaving messages in a block-level data storage device, a data store or file storage region shared by both the bubble 212 and the parent virtual machine 210. In still other embodiments usable in combination with other embodiments, the bubble 212 and the parent virtual machine 210 may communicate with each other via a virtual network connection between the bubble 212 and the parent virtual machine 210.

Figure 3:
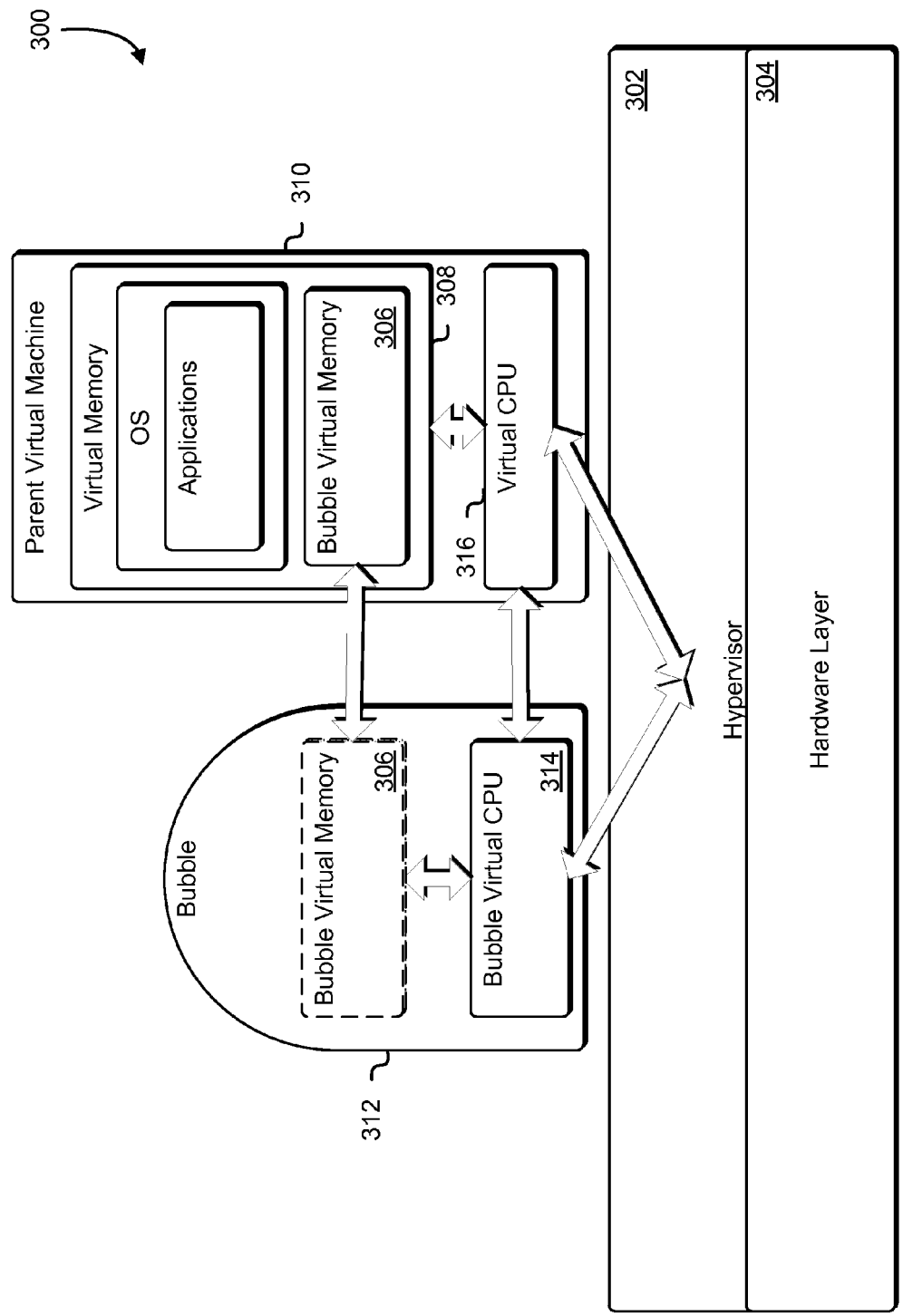
FIG. 3 illustrates an example of virtual memory and a virtual processor within a bubble in accordance with an embodiment.

FIG. 3 illustrates an aspect of an host computer 300 in which various embodiments of the present disclosure may be practiced. As illustrated in FIG. 3, the host computer 300 may include a hypervisor 302 for managing virtual machines and acting as an interface to a hardware layer 304. FIG. 3 is intended to illustrate some embodiments of bubble virtual memory 306 and the virtual memory 308 of a parent virtual machine 310 of a bubble 312. FIG. 3 further illustrates a relationship between a bubble virtual processor 314 and a virtual processor 316 of the parent virtual machine 310.

In some embodiments, the bubble virtual memory 306 is allocated from the virtual memory 308 of the parent virtual machine 310. For example, a parent virtual machine 310 may initially have 60 gigabytes of virtual memory 308, and, upon spawning a bubble 312, five gigabytes of the virtual memory 308 may be reserved for use by the bubble 312 as the bubble virtual memory 306. In some of these embodiments, if the memory size of the parent virtual machine 310 increases or decreases, the size of the bubble virtual memory 306 may also increase or decrease—in some cases the increase or decrease of the size of the bubble virtual memory 306 is proportional to the increase or decrease in the size of the virtual memory 308 of the parent virtual machine 310. For instance, in the above example, if the virtual memory 308 is increased by 20% to 72 gigabytes, the bubble virtual memory 306 may likewise be increased by 20% to six gigabytes. In some embodiments, the bubble virtual memory 306 may be separately allocated to the bubble 312 by the hypervisor 302 and the virtual memory 308 may not be reserved for use by the bubble 312. In other cases, a memory balloon driver may govern the relationship between the bubble virtual memory 306 and the virtual memory 308 of the parent virtual machine 310 such that the memory available for use by the bubble 312 fluctuates based on memory usage requirements of the parent virtual machine 310; for example, the bubble virtual memory 306 available to the bubble 312 may be greater when the parent virtual machine 310 has more unused memory, whereas the bubble virtual memory 306 may decrease when the parent virtual machine 310 is using more of its virtual memory 308. In cases where the bubble virtual memory 306 is allocated separately from the parent virtual machine 310 virtual memory 308, the balloon driver may transfer memory to/from the overall memory of the host server.

In some embodiments, the bubble 312 may have read-only access to some or all of the virtual memory 308 of the parent virtual machine 310 (i.e., the bubble 312 may not modify the virtual memory 308 of the parent virtual machine 310). In these embodiments, the bubble 312 may have read/write access to bubble virtual memory 306 separately allocated to the bubble 312 by the hypervisor 302. In other embodiments, the bubble 312 may have read/write access to the bubble virtual memory 306 that is a portion of the virtual memory 308 of the parent virtual machine 310, but have read-only access to the remainder of the virtual memory 308 (i.e., the portion not allocated to the bubble 312). In some embodiments, the parent virtual machine 310 may have read-only access to the bubble virtual memory 306, in other embodiments, the parent virtual machine 310 may have read/write access to the bubble virtual memory 306, and in still other embodiments, the parent virtual machine 310 may have neither read nor write access to the bubble virtual memory 306.

The bubble virtual processor 314 may be a virtual processor configured and scheduled separately from the virtual processor 316 of the parent virtual machine 310. However, in some embodiments, the bubble virtual processor 314 may draw upon the virtual processor 316 of the parent virtual machine 310 for the bubble virtual processor 314 processing power. For example, the service plan of the parent virtual machine 310 may assign the virtual processor 316 of the customer owner a specified amount of computational units for processing, in this embodiment, the bubble virtual processor 314 may be allocated a specified number of those computational units for processing tasks assigned to the bubble 312. In some cases of this embodiment, the computational units available to the bubble virtual processor 314 may increase or decrease based on the usage requirements of the virtual processor 316 of the parent virtual machine 310; for example, in situations where the virtual processor 316 is being heavily utilized, processing power available to the bubble virtual processor 314 may decrease, whereas in situations where the virtual processor 316 is largely idle, the processing power available to the bubble virtual processor 314 may increase. On the other hand, in some cases, the bubble 312 may be utilized for performing high-priority and/or speed-critical tasks, and in such cases the processing power allocated to the bubble virtual processor 314 may take priority over tasks being performed by the 316 even though the virtual processor 316 of the parent virtual machine 310 may be being heavily utilized.

Figure 4:
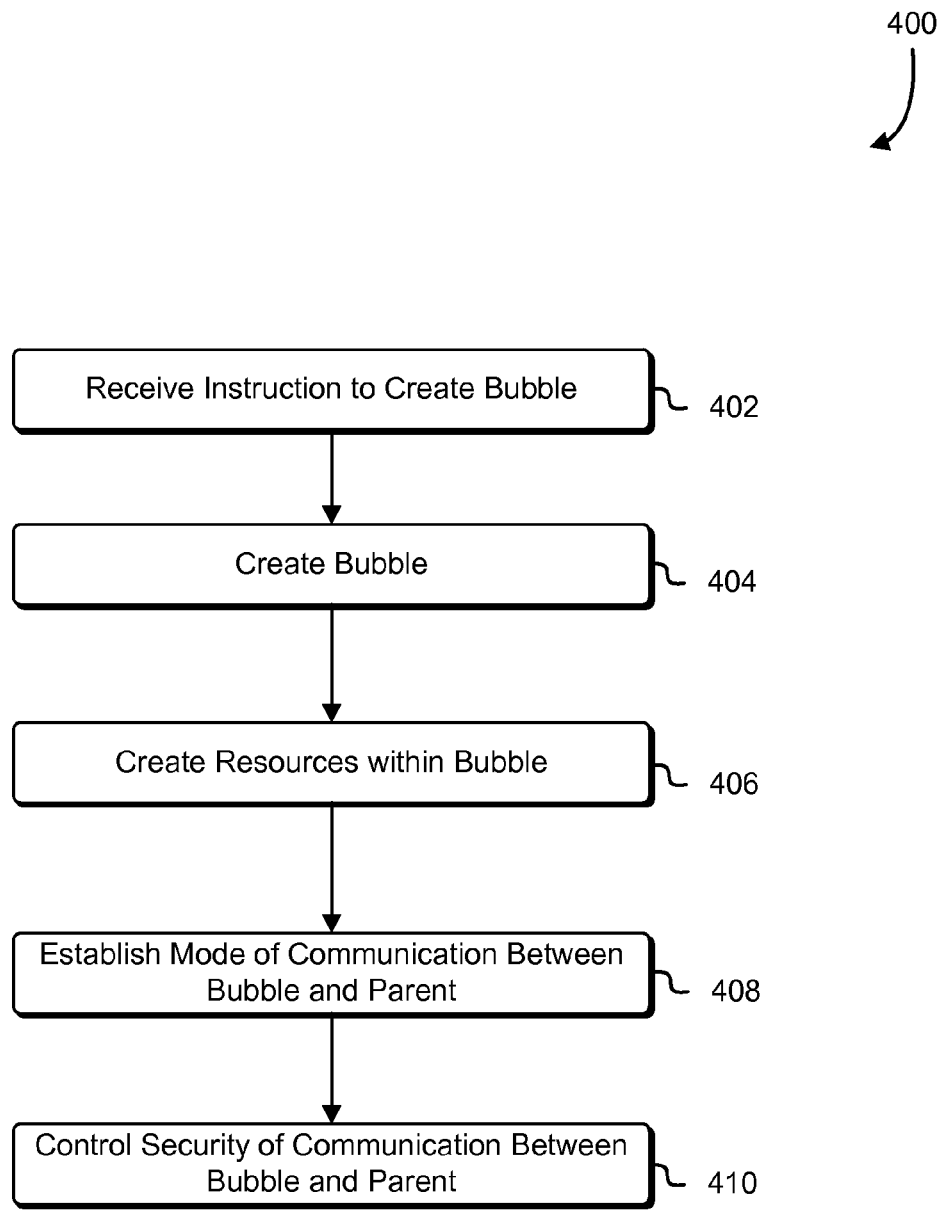
FIG. 4 is a block diagram that illustrates an example of the creation of a bubble in accordance with an embodiment.

FIG. 4 is a block diagram illustrating an example of a process 400 for creating a bubble in accordance with various embodiments. The process 400 may be performed by any suitable system such as a server in a distributed system of a data center, or any electronic client device such as the electronic client device 902, web server 906, and application server 908 described in conjunction with FIG. 9, capable of hosting virtual machines. The process 400 includes a series of operations in which a bubble is created in accordance with a request. In 402, a hypervisor executing on a computing device receives an instruction to create a bubble. For example, a customer may have a management console/interface in the form of a web page or standalone application for management of customer virtual machines of a computing resource service provider, and the customer may have a selectable option to "Create Bubble" from the management console for a specified virtual machine (e.g., guest domain) or other execution environment. Such a management console may be running on a computing device, such as on a computing system of the customer, physically remote from the host machines running the customer virtual machines and may be connected to the host machines through a network, such as the Internet. In such an example, selecting the option to create a bubble causes a request to be submitted to create a bubble and associate the bubble with the specified virtual machine. In many cases, the instruction to create a bubble may be received from an instance of a virtual machine (i.e. guest domain) executing under the control of the virtualization layer, but in other cases the instruction to create a bubble may be received from some other service or resource. In some cases, the instruction to create a bubble on the host computing device may be received from a virtual machine, service, or resource executing on a remote computing device. For example, a virtual machine executing under the control of a hypervisor running on a physical host machine may request the creation of a bubble for the virtual machine, and the bubble is created under the control of a different virtualization layer running on a different physical host machine; in such a case, the bubble and parent virtual machine may communicate with each other through a network, such as a local area network or the Internet.

In some embodiments, a user may generate a request that causes a computing resource service provider to create a bubble by submitting an application programming interface request to the computing resource service provider that directly or indirectly causes the computing resource service provider to create a bubble in fulfillment of the request. In other embodiments, such a request may be in the form of a hypercall that is trapped by a hypervisor of a virtual computer system service of the computing resource service provider. The request may include data or other instructions to be processed within the bubble, or the data and/or other instructions may be provided to the computing resource service provider separately. The bubble, upon receipt of the data and/or other instructions may respond to requesting entity (e.g., customer, user, service, application or resource) with a message indicating that the data and/or instructions were or were not properly received, may process the data and/or instructions and respond to the entity with a result of the processing, or may process the data and/or instructions and respond to the user with an error or no response at all.

In an embodiment, the instruction to create a bubble is received in response to a customer, application, service, or resource making a particular call to an application programming interface of a control plane. In a virtual computing system, the control plane, as used herein, may be a distributed computer system configured to be responsible for managing the locations and quantities of virtual machines hosted by a computing resource service provider, what resources are being used by particular virtual machines and where the resources are located. The control plane may be comprised of various agents and other applications executing on computing devices of a computing resource service provider, and the control plane and/or its agents and/or other applications may cause various operations to be performed on virtual machines of a computing resource service provider. For example, a customer may instruct the control plane to retrieve and report the status, such as whether the instance must be rebooted, whether the instance requires maintenance, or whether the instance must be shut down, of an instantiation of a virtual machine or resource in the distributed system. Or, a customer may send commands to the control plane to perform actions on a specified instantiation of a virtual machine or resource, such as an instruction to power up, reboot, or shut down an instance. In another example, a customer may send an instruction through the control plane to have a specified instance generate a key pair, whereupon the control plane may cause the specified instance to generate the key pair and may provide the customer with the private key of the key pair. These and numerous other operations may be performed on bubbles in a similar manner as they may be performed on other instantiations of virtual machines. Thus, in this embodiment, a computer system, such as a computer system hosting a management console of a customer of a computing resource service provider, may make a call to the control plane of a virtual computing service to create a bubble, In such an embodiment, the call may pass the identity of the parent virtual machine instance (e.g., "create_bubble(instance_id)") to instruct the control plane to create a bubble and add a route between the parent virtual machine (e.g., instance_id) and the newly-created bubble to the virtualized routing table.

In another embodiment, the instruction to create a bubble may be received through an interface for creating a bubble, such as an executable instruction to an instance metadata service (e.g., "//dev/bubbled_interface") which, when executed, causes a bubble to be created for the parent virtual machine instance. In another embodiment usable with other embodiments, an instruction to create a bubble may be a processor instruction being trapped by the virtualization layer. For example, an instruction may be made to a processor that, while not recognized by the processor, is recognized by the virtualization layer as being an instruction to create a bubble, and, in response, rather than throwing an instruction-not-supported trap, the virtualization layer traps the instruction and creates a bubble for the parent virtual machine instance.

In 404, a bubble is created, i.e., instantiated as a virtual machine under control of a hypervisor, according to the instruction received in 402. The bubble, as noted, may have virtual processors and may have virtual memory. As noted, the virtual memory may be separate memory allocated to the bubble by the hypervisor, may be a portion of the memory of the parent virtual machine reserved for the bubble, may be a portion of the memory of the parent virtual machine shared between the bubble and the parent virtual machine. In some cases, the virtual memory of the bubble may be managed by a memory balloon driver. The virtual processor of the bubble may be a virtual processor separately allocated to the bubble, may be a processor utilizing a portion of the computational power of the parent virtual machine processor, and/or may use CPU stealing to take advantage of unused processor cycles of the parent virtual machine or host machine processors. In some cases, a bubble may include a bootloader for locating and instantiating executable code within the bubble. The bubble may obtain an encrypted bootloader from the parent virtual machine or other trusted source, such as the virtualization layer, and in such a case may decrypt and instantiate the bootloader within the bubble. In some cases the bubble may have an operating system and in other cases the bubble may not. In still another embodiment, the bubble may be instantiated and run on a dongle device.

In 406, the bubble may be assigned resources or services. However, a bubble may be instantiated without further resources than those described in reference to 404. Resources a bubble may be instantiated with include block-level data storage services, cryptography services, and on-demand data storage services. These resources and services may be independently allocated to the bubble, or, alternately, the bubble may share these resources and services with the parent virtual machine. As noted, in some cases the bubble may have access to resources not normally available to the parent virtual machine, such as access to Intel® Software Guard eXtensions instructions.

In 408, modes of communication between the bubble and the parent virtual machine are established. In some cases, a mode of communication may be a virtualized network connection between the bubble and the parent virtual machine. In other cases, the mode of communication may be a memory region or shared data store in which the bubble and the parent virtual machine may leave messages and/or instructions for each other. In some cases the bubble and virtual machine may send messages and instructions to each other through a message-passing application protocol interface managed by the virtualization layer.

Then, in 410, the mode of communication is secured. In some cases, security is ensured by encrypting the information passed to the mode of communication, and the receiving party, either the bubble or the parent virtual machine may decrypt and read the messages upon receipt by using a private key. In some of these cases, a public-private encryption scheme may be used and the parent virtual machine may have a public key for encrypting messages and the bubble has a private key for decrypting the messages. In others of these cases, the bubble and the parent virtual machine each have a key provided by the virtualization layer for encrypting messages sent to and decrypting messages received from the other. In other cases, the virtualization layer may manage the security of the messages being passed between the bubble and the parent virtual machine.

Note that the operations performed in 404-410 may be performed in various orders, including in parallel. Note also that, unless otherwise specified, expressions regarding executable instructions (also referred to as code, applications, agents, etc.) performing operations that instructions do not ordinarily perform unaided (e.g., transmission of data, calculations, and the like) denote that the instructions are being executed by a machine, and thus causing the machine to perform the specified operations.

In some embodiments, the bubble might report that it has a virtual processor capable of supporting Intel® SGX or trusted platform model instructions even when the physical processors of the host machine do not support such instructions. In this embodiment, digitally signed attestations resulting from executing the instruction calls may be made using a key provided by the virtualization layer of the computing resource service provider rather than a physical processor. In this manner, executable instructions configured to run in an Intel® Software Guard eXtension environment may be executed harmoniously in a bubble.

In some embodiments, the virtual processor of the bubble recognize instructions meant for a type of processor different than the type of processor reported by the virtual processor of the bubble. In such a case, the virtual processor may intercept and recognize the instruction, replacing the instruction with an instruction compatible with the physical processor of the host machine. In these embodiments, the virtual processor may provide compatibility for code originally designed to run on different hardware than that supported by the physical hardware of the host machine. Furthermore, these embodiments improve the capability of instantiating bubbles on host machines remotely located from the machines hosting the parent virtual machine instance, and executing instructions provided by those parent virtual machine instances when the physical hardware of the two host machines may not normally be compatible.

In a computing resource service provider environment, service plans for customers may include costs for features related to bubbles. For example, a customer may pay for a service plan that includes instantiation of bubbles that may be instantiated by virtual machines under the service plan. In some cases, there may be a limit of one bubble per virtual machine, while in other cases virtual machines may have multiple bubbles. In some cases, a service plan may charge for bubbles based on the usage of the bubble. For example, the bubble may incur costs under the service plan based on the time spent executing instructions, based on the compute power of virtual processor instantiated within the bubble, based on the memory allocated to the bubble, based on support for particular features, such as Intel® Software Guard eXtension instructions, and/or based on an amount of storage used in a block-level or on-demand data storage service.

Figure 5:
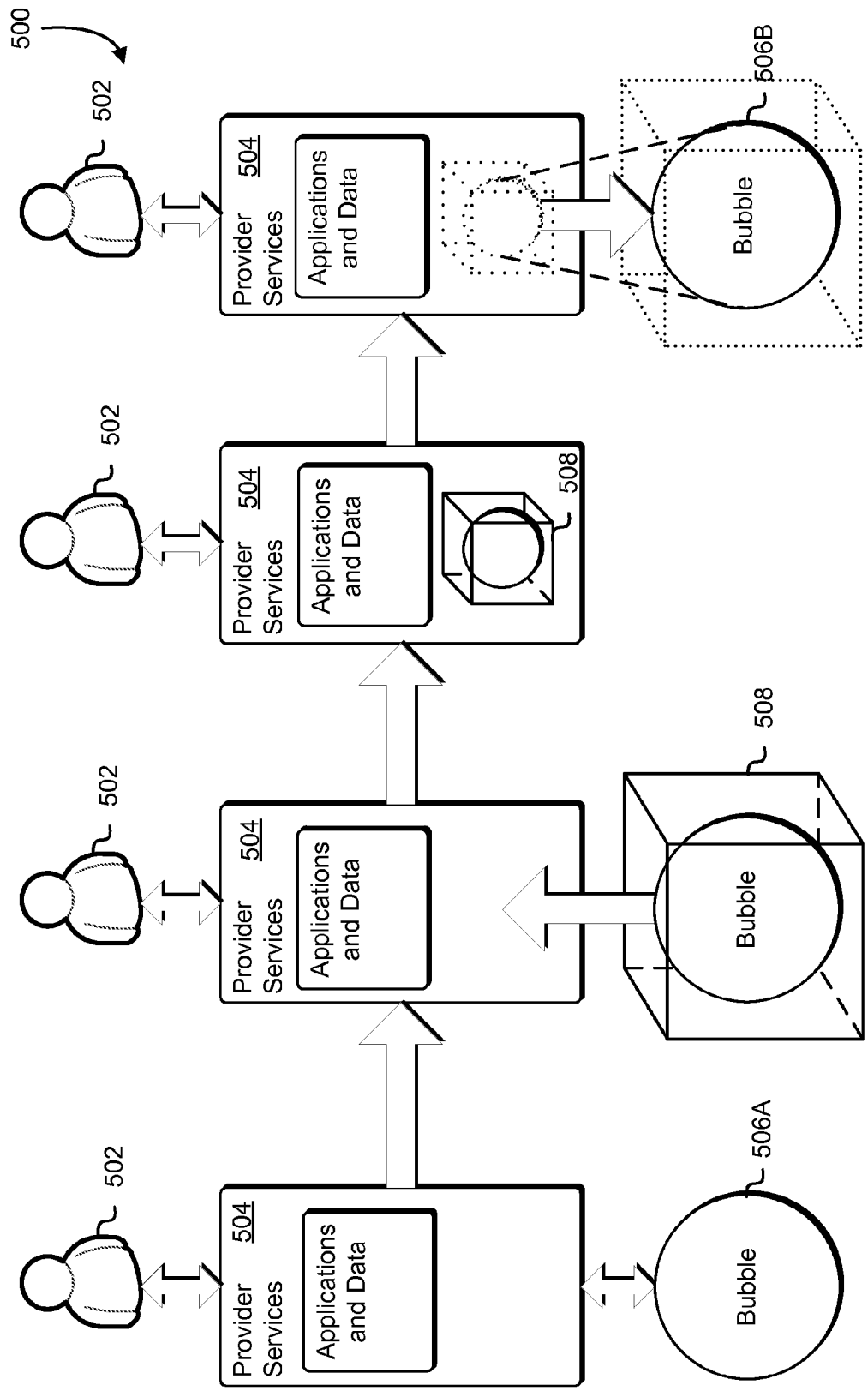
FIG. 5 illustrates an example of suspending and restoring a bubble in accordance with an embodiment.

FIG. 5 illustrates an aspect of an environment 500 in which various embodiments of the present disclosure may be practiced. As illustrated in FIG. 5, the environment 500 may involve suspending and/or restoring a bubble. Specifically, FIG. 5 depicts a customer 502 having an account with a computing resource service provider in which services 504 are provided for executing applications and performing operations on data, the services 504 further configured to support the creation of bubbles, such as bubble 506A. As noted, the provider services 504 may be similar to the computing resource service provider described in reference to FIG. 8. The bubble 506A may be any suitable bubble described.

As noted, in some embodiments the bubble may have a basic set of resources, such as memory and a virtual or real processor, essential to perform specific tasks required of the bubble. The bubble may be created and owned by a parent virtual machine instance of a customer. However, in some embodiments, bubbles may already be available for use on the virtualization layer and may be coupled to customer instances as needed. For example, a customer virtual machine instance may, at the behest of the customer or an application executing in the operating system of the customer virtual machine instance, make a call to an application programming interface to utilize a bubble. In such a case, if an idle bubble already exists in the virtualization layer (an idle bubble being a bubble not currently linked to a virtual machine instance and not currently performing any tasks), the virtualization layer may establish communication between the customer virtual machine instance and the idle bubble in much the same was as if the bubble had been created in response to a request by the customer virtual machine instance. Otherwise, if no idle bubble existed, the virtualization layer may cause a new bubble to be created and associated with the customer virtual machine instance or may instead wait until a currently-active bubble becomes idle. In such cases, once the bubble completes tasks assigned to it by the customer virtual machine instance, the virtualization layer may disconnect or suspend the bubble until it is needed again by the same or other virtual machine instance.

As depicted in the first stage, a bubble 506A has already been created and assigned to the services 504 of the customer 502. In the second stage, an instruction may be given, for example, as a hypercall to the hypervisor, to suspend and store applications and data that may be running in the bubble 506A. The instruction may be given by the customer or a trusted application or resource of a trusted virtual machine of the services 504. As a result of the instruction, the hypervisor may suspend the bubble by storing the state of the virtual processor and the state and contents of the virtual memory of the bubble into a data store as a frozen bubble 508 that, in some cases, may reside as a resource of the services 504, as depicted in the third stage. In this manner, the bubble may be suspended for later use without consuming processing and memory resources of the host machine and may incur less cost to the customer 502 than if the bubble had been actively running. In some cases the frozen bubble 508 may be encrypted before storage and decrypted and verified when restored. In other cases, the frozen bubble 508 may be stored at an external storage location.

The fourth stage depicted in FIG. 5 illustrates a frozen bubble 508 being restored from suspension. In this stage an instruction may be given, for example, as a hypercall to the hypervisor to restore the frozen bubble 508 to an active and running state. As in the instruction to suspend, the instruction to restore may be given by the customer 502 or a trusted application or resource of the trusted virtual machine of the services 504 associated with the bubble 506A. The frozen bubble 508 may be retrieved from its storage location, such as the data store of the services 504, and instantiated as a bubble 506B instance on the host machine of the virtual machine of the services 504 or on a different host machine in accordance with the embodiments described herein. If the frozen bubble 508 had been encrypted, the frozen bubble 508 may be decrypted using an appropriate key held by a trusted entity of the services 504. After restoration, the bubble 506B may resume operations it had been performing before being suspended or may be configured to receive new instructions by the virtual machine of the services 504, as would be appropriate, and similar to the modes of creation of a bubble as described elsewhere herein, such as in conjunction with FIG. 4.

Figure 6:
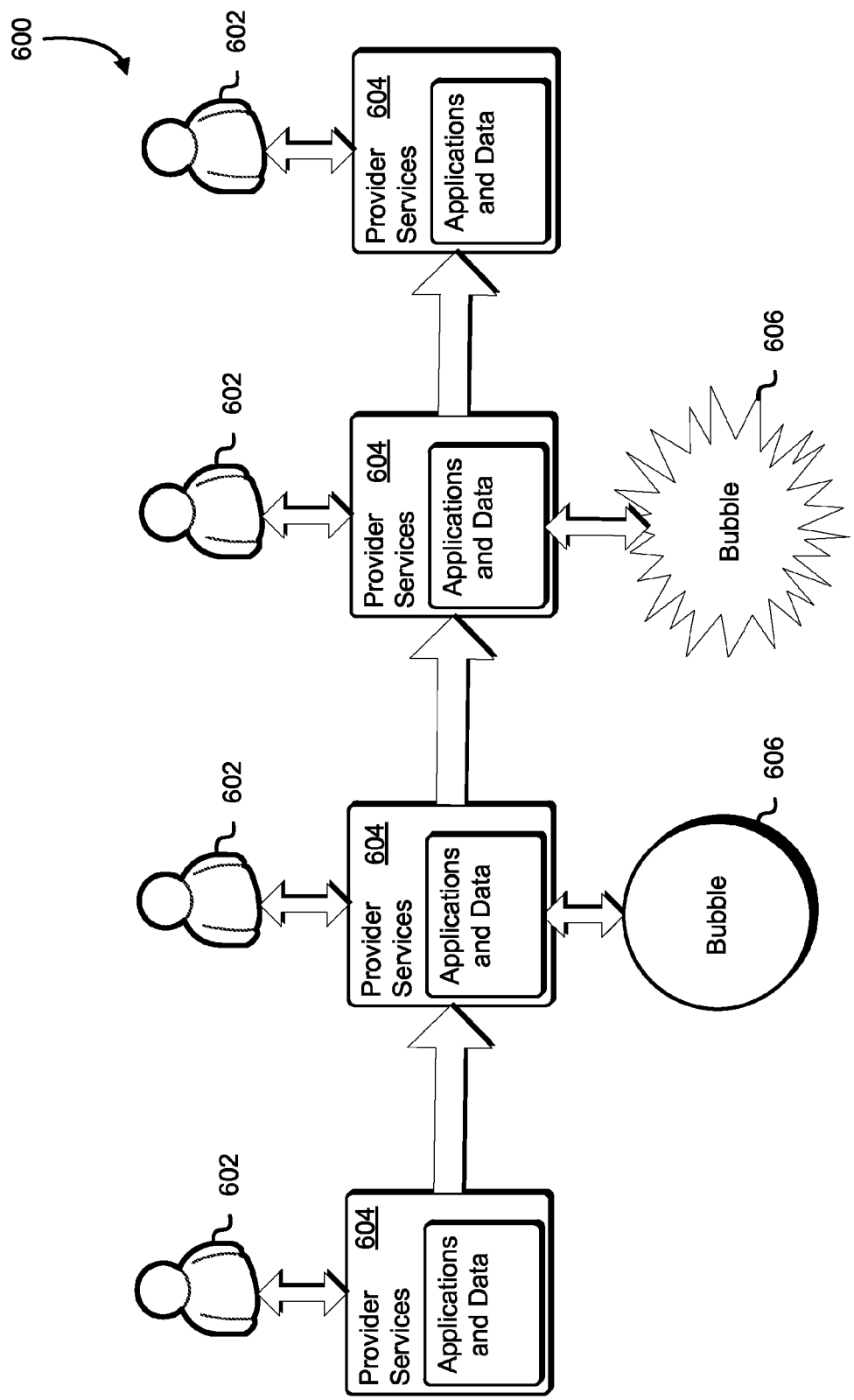
FIG. 6 illustrates an example of deprovisioning a bubble in accordance with an embodiment.

FIG. 6 illustrates an aspect of an environment 600 in which various embodiments of the present disclosure may be practiced. As illustrated in FIG. 6, the environment 600 may support the functionality of bubbles and, as a result, operation of the environment 600 may involve deprovisioning a bubble. Specifically, FIG. 6 depicts a customer 602 having an account with a computing resource service provider in which services 604 are provided for executing applications and performing operations on data, the services 604 further configured to support bubbles, such as bubble 606. As noted, the provider services 604 may be similar to the computing resource service provider described in reference to FIG. 8. The bubble 606 may be any suitable bubble described herein.

The first stage depicted in the environment 600 represents the customer 602 and the subscribed services 604 before the creation, assignation, or restoration of a bubble associated with the services 604. In the second stage a bubble 606 has been assigned to the services 604 of the customer 602. Note that the assignment of the bubble 606 may have been made in any manner contemplated by the present disclosure, including creation of the bubble 606 in a manner similar to the creation process described in connection with FIG. 4, assigned to the services 604 by a hypervisor in embodiments where the bubble 606 may have already been created and available, or restored from suspension similar to the suspension and restoration process described in conjunction with FIG. 5.

The third stage of environment 600 depicts the bubble 606 being deprovisioned. In this stage, an instruction may have been given, for example, in the form of a hypercall to a hypervisor to deprovision the specified bubble 606. The instruction may have been given by the customer 602 or a trusted application or resource of a trusted virtual machine of the services 604 associated with the bubble 606. Deprovisioning the bubble 606 may involve releasing virtual memory, virtual processors any allocated resources or services previously allocated to the bubble 606. In cases where the virtual memory of the bubble 606 had been reserved from virtual memory of a parent virtual machine, the parent virtual machine may have the previously-reserved memory regions available for use after the deprovisioning. Likewise, in cases where the bubble 606 had been utilizing a portion of the computational power of the parent virtual machine, the portions may be released and made available for use by the parent virtual machine. The fourth stage of the environment 600 is shown to illustrate that after the deprovisioning of the bubble 606, the state of the services 604 is similar to the state in the first stage, before the bubble 606 had been assigned.

Figure 7:
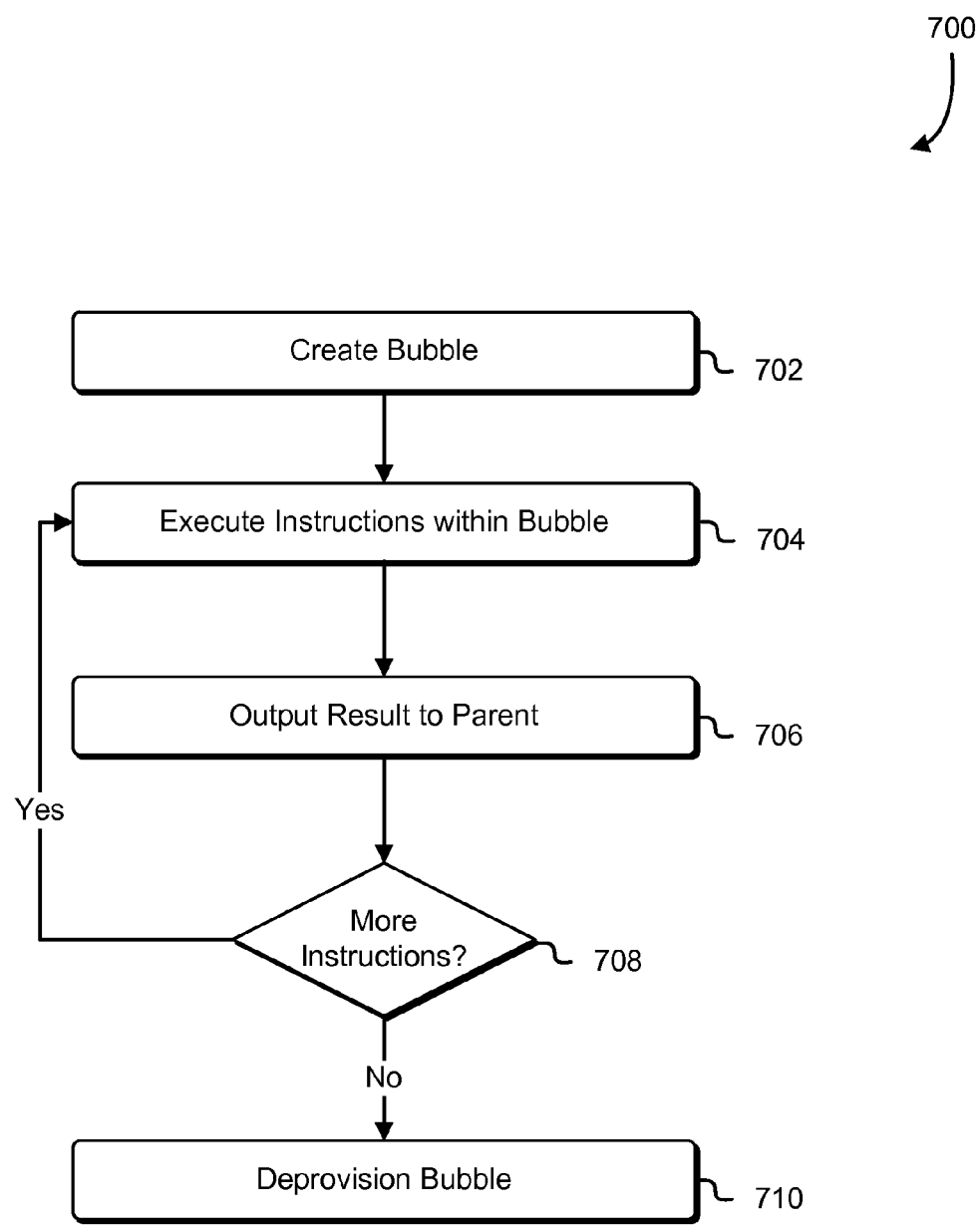
FIG. 7 is a flow chart that illustrates an example of a bubble being deprovisioned after task completion in accordance with an embodiment.

FIG. 7 is a flow chart illustrating an example of a process 700 for creation, operation, and deprovisioning a bubble in accordance with various embodiments. The process 700 may be performed by any suitable system such as a server in a distributed system of a data center, or any electronic client device such as the electronic client device 902, web server 906, and application server 908 described in conjunction with FIG. 9, capable of hosting virtual machines. In 702, in response to a need by a parent virtual machine, an instruction may be made that causes a bubble to be created. In some examples, the need is a need by the parent virtual machine to perform operations on sensitive data securely without risk that the data or results could be intercepted or tampered with. In other examples, the need may be to utilize the bubble for a specialized task in cases where the computing resource service provider may have configured certain bubbles to have greater or more specialized compute power than the parent virtual machine, such as bubbles specially configured for performing three-dimensional rendering or other particular image processing operations more efficiently than the parent virtual machine. Creation of a bubble in 702 may occur in a manner similar to that described in conjunction with FIG. 4.

In 704, the parent virtual machine provides instructions for the bubble to execute or provides data for the bubble to perform operations on. In some cases the instructions and/or may be encrypted and passed to the bubble using a public key held by the parent virtual machine, whereupon the instructions and/or data may be decrypted using a private key held by the bubble. In some cases, instructions and/or data may be passed to the bubble using a call to a message-passing application programming interface. In other cases, instructions and/or data may be passed by making certain hypercalls to the hypervisor. In still other cases, instructions and/or data may be passed by writing the instructions and data to a memory region or data store shared between the bubble and the parent virtual machine. Note that these modes of passing instructions and/or data between bubbles and parents are not meant to be an exhaustive recitation, and that any manner of passing instructions between a bubble and a parent virtual machine may be used as would be contemplated by persons having ordinary skill in the art. In 704, after receiving the instructions and/or data by the parent virtual machine, the bubble executes the instructions or performs the desired operations on the data. Note that the instructions in this context may be executable instructions (i.e., executable code) or instructions (i.e., commands) to perform a particular operation using executable code that may already be present within the bubble. Furthermore, instructions may be direct or indirect; for example, instructions may be indirectly given by passing data from the parent virtual machine to the bubble, thus triggering particular operations to be performed on the data or on other data as a consequence of receiving the data.

In 706, the bubble communicates a message to the parent virtual machine. For example, the bubble may report the results of having executed the instructions or performed operations on the data provided by the parent virtual machine. As one example of the operation at 704 may be that the parent virtual machine may have provided consumer credit card information (e.g., from a consumer purchase of goods from an online marketplace) to the bubble for secure verification and processing, and the bubble may respond to the parent virtual machine with a message stating whether the processing succeeded or failed. On as another non-limiting example, the parent virtual machine may have provided the bubble with graphics primitives for rendering, and the bubble outputs the rendered image to the parent virtual machine. In some cases, the output of the bubble may be encrypted with a key held by the bubble and the output may be decrypted with a key held by the parent virtual machine. In some cases the security of the output of the bubble may be ensured by the hypervisor. In some cases the output of the bubble may be digitally signed with a private key held by the bubble as assurance that the output has not been tampered with.

In 708, a determination is made whether further operations need to be performed by the bubble. If further operations are to be performed, the system performing the process 700 returns to 704 to perform the operations. Otherwise, if the bubble is no longer needed, the system performing the process 700 proceeds to 710 where it may be deprovisioned. In some cases, the bubble may remain idle and awaiting further instructions for a threshold amount of time before proceeding to 710 if no further instructions are received. In 710, the bubble, having completed its assigned tasks, is deprovisioned in accordance with the deprovisioning of a bubble described in conjunction with FIG. 6. Alternately, in some cases the bubble may not be deprovisioned but may be suspended and stored in a similar manner to that described about FIG. 5. In some other embodiments, the bubble may be disassociated with the parent virtual machine and remain idle until re-assigned to the same or other virtual machine in need of a bubble.

Figure 8:
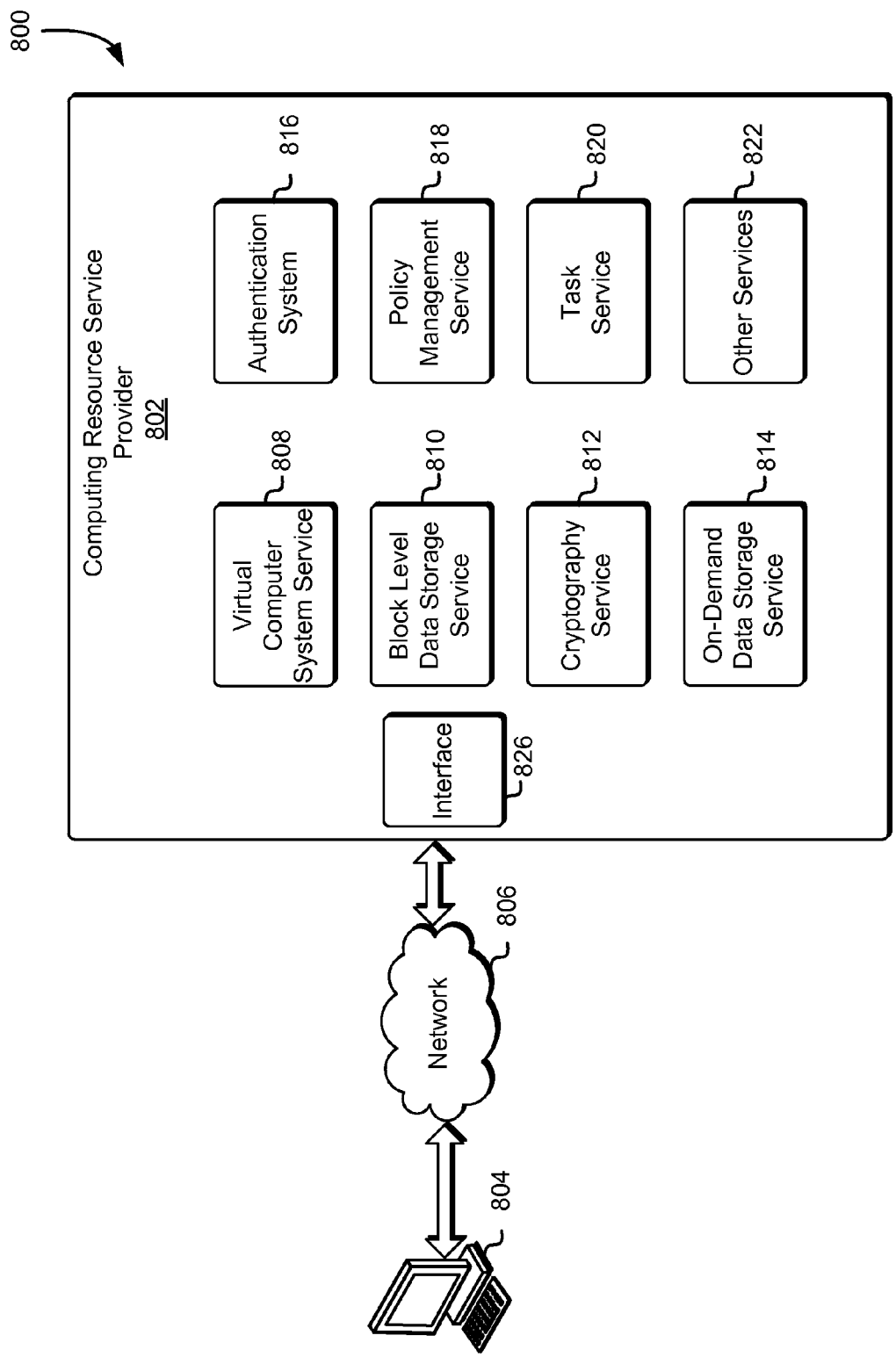
FIG. 8 illustrates a computing device that may be used in accordance with an embodiment.

FIG. 8 shows an example of a customer connected to a computing resource service provider in accordance with at least one embodiment. The computing resource service provider 802 may provide a variety of services to the customer 804 and the customer 804 may communicate with the computing resource service provider 802 via an interface 826, which may be a web services interface or any other type of customer interface. While FIG. 8 shows one interface 826 for the services of the computing resource service provider 802, each service may have its own interface and, generally, subsets of the services may have corresponding interfaces in addition to or as an alternative to the interface 826. The customer 804 may be an organization that may utilize one or more of the services provided by the computing resource service provider 802 to maintain and deliver information to its employees, which may be located in various geographical locations. Additionally, the customer 804 may be an individual that utilizes the services of the computing resource service provider 802 to deliver content to a working group located remotely. As shown in FIG. 8, the customer 804 may communicate with the computing resource service provider 802 through a network 806, whereby the network 806 may be a communication network, such as the Internet, an intranet or an Internet service provider (ISP) network. Some communications from the customer 804 to the computing resource service provider 802 may cause the computing resource service provider 802 to operate in accordance with one or more embodiments described herein or a variation thereof.

The computing resource service provider 802 may provide various computing resource services to its customers. The services provided by the computing resource service provider 802, in this example, include a virtual computer system service 808, a block-level data storage service 810, a cryptography service 812, an on-demand data storage service 814, an authentication system 816, a policy management service 818, a task service 820 and one or more other services 822. It is noted that not all embodiments described herein include the services 808-824 described with reference to FIG. 8 and additional services may be provided in addition to or as an alternative to services explicitly described herein. As described herein, each of the services 808-824 may include one or more web service interfaces that enable the customer 804 to submit appropriately configured application programming interface calls to the various services through web service requests. In addition, each of the services may include one or more service interfaces that enable the services to access each other (e.g., to enable a virtual computer system of the virtual computer system service 808 to store data in or retrieve data from the on-demand data storage service 814 and/or to access one or more block-level data storage devices provided by the block-level data storage service 810).

The virtual computer system service 808 may be a collection of computing resources configured to instantiate virtual machine instances on behalf of the customer 804. The customer 804 may interact with the virtual computer system service 808 (via appropriately configured and authenticated application programming interface calls) to provision and operate virtual computer systems that are instantiated on physical computing devices hosted and operated by the computing resource service provider 802. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications. Although the virtual computer system service 808 is shown in FIG. 8, any other computer system or computer system service may be utilized in the computing resource service provider 802, such as a computer system or computer system service that does not employ virtualization or instantiation and instead provisions computing resources on dedicated or shared computers/servers and/or other physical devices.

The block-level data storage service 810 may comprise one or more computing resources that collectively operate to store data for a customer 804 using block-level storage devices (and/or virtualizations thereof). The block-level storage devices of the block-level data storage service 810 may, for instance, be operationally attached to virtual computer systems provided by the virtual computer system service 808 to serve as logical units (e.g., virtual drives) for the computer systems. A block-level storage device may enable the persistent storage of data used/generated by a corresponding virtual computer system where the virtual computer system service 808 may only provide ephemeral data storage.

The computing resource service provider 802 also includes a cryptography service 812. The cryptography service 812 may utilize one or more storage services of the computing resource service provider 802 to store keys of the customers in encrypted form, whereby the keys may be usable to decrypt customer 804 keys accessible only to particular devices of the cryptography service 812.

The computing resource service provider 802 further includes an on-demand data storage service 814. The on-demand data storage service 814 may be a collection of computing resources configured to synchronously process requests to store and/or access data. The on-demand data storage service 814 may operate using computing resources (e.g., databases) that enable the on-demand data storage service 814 to locate and retrieve data quickly, so as to allow data to be provided in responses to requests for the data. For example, the on-demand data storage service 814 may maintain stored data in a manner such that, when a request for a data object is retrieved, the data object can be provided (or streaming of the data object can be initiated) in a response to the request. As noted, data stored in the on-demand data storage service 814 may be organized into data objects. The data objects may have arbitrary sizes except, perhaps, for certain constraints on size. Thus, the on-demand data storage service 814 may store numerous data objects of varying sizes. The on-demand data storage service 814 may operate as a key value store that associates data objects with identifiers of the data objects which may be used by the customer 804 to retrieve or perform other operations in connection with the data objects stored by the on-demand data storage service 814.

As illustrated in FIG. 8, the computing resource service provider 802, in various embodiments, includes an authentication system 816 and a policy management service 818. The authentication system 816, in an embodiment, is a computer system (i.e., collection of computing resources) configured to perform operations involved in authentication of users of the customer. For instance, one of the services 808-816 and 820-824 may provide information from a user to the authentication system 816 to receive information in return that indicates whether or not the user requests are authentic.

The policy management service 818, in an embodiment, is a computer system configured to manage policies on behalf of customers (such as customer 804) of the computing resource service provider 802. The policy management service 818 may include an interface that enables customers to submit requests related to the management of policy. Such requests may, for instance, be requests to add, delete, change or otherwise modify policy for a customer or for other administrative actions, such as providing an inventory of existing policies and the like.

The computing resource service provider 802, in various embodiments, is also equipped with a task service 820. The task service 820 is configured to receive a task package from the customer 804 and enable executing tasks as dictated by the task package. The task service 820 may be configured to use any resource of the computing resource service provider 802, such as one or more instantiated virtual machines or virtual hosts, for executing the task. The task service 820 may configure the one or more instantiated virtual machines or virtual hosts to operate using a selected operating system and/or a selected execution application in accordance with a requirement of the customer 804.

The computing resource service provider 802 additionally maintains one or more other services 822 based at least in part on the needs of its customers 804. For instance, the computing resource service provider 802 may maintain a database service for its customers 804. A database service may be a collection of computing resources that collectively operate to run one or more databases for one or more customers 804. The customer 804 may operate and manage a database from the database service by utilizing appropriately configured application programming interface calls. This, in turn, may allow a customer 804 to maintain and potentially scale the operations in the database. Other services include object-level archival data storage services, services that manage and/or monitor other services.

In some embodiments, the services provided by the computing resource service provider 802 may include interfaces, such as the interface 826 that enable the customer to submit requests via, for example, appropriately-configured application programming interface calls to the various services. In addition, each of the services may include service interfaces that enable the services to access each other (e.g., to enable a virtual computer system of the virtual computer system service to store data in or retrieve data from the on-demand data storage service 814 and/or access black-level data storage devices provided by a block-level data storage service 810). Each of the service interfaces may also provide secured and/or protected access to each other via encryption key, thus enabling secure and/or protected access between them. Collections of services operating in concert as a distributed computer system may have a single front-end interface and/or multiple interfaces between the elements of the distributed computer system.

Some of the access provided by the computing resource service provider 802 may include providing the use of a computer system to host sensitive applications and/or sensitive data for a customer. The computing resource service provider 802 may also provide data storage regions, and, consequentially, some of the data storage regions provided by the computer system may be configured to store sensitive and/or otherwise significant data. Examples of such sensitive and/or secure data include financial data, market strategies, user names, passwords, and security keys. The computer system may also run applications, processes, services, and modules configured to access and/or manipulate such sensitive and/or secure data. Additionally, the computer system may include operating systems, privileged users, and controlling domains which may have full access to the computer resources such as direct access to computer memory, central processing units, storage, and networks. The customer may interact with the virtual computer system to provision, place and operate virtual machine instances that are instantiated on physical computer devices hosted and operated by the computing resource service provider 802. The virtual machine instances may be used for various purposes, such as to operate as servers supporting a website, to operate business applications or, generally, to serve as compute power or the customer. Other applications for the virtual machine instances may be to support database applications, electronic commerce applications, and/or business applications.

A virtual computer system service may be used by the computing resource service provider 802 for providing these computer system resources for customers. The virtual computer system service may provide such computer system resources by instantiating virtual machine instances on physical hardware. The physical hardware may include physical hosts which may include any device or equipment configured to execute instructions for performing data computation, manipulation or storage tasks, such as a computer system or server similar to the client device 902 and the application server 908 described in conjunction with FIG. 9. A virtualization layer in the computing resource service provider 802 may enable the physical hardware to be used to provide computational resources upon which virtual hosts may operate. The virtualization layer may be any device, software or firmware used for providing a virtual computer platform for the virtual hosts. The virtual computer platform may include various virtual computer components, such as virtual processors, virtual memory, virtual devices and the like. The virtual hosts may be provided to customers of the computing resource service provider 802 and the customers may run operating systems and applications on the virtual host.

Using the resources provided by the computing resource service provider 802, bubble functionality may be provided to the customer and various other services. For example, a virtual computing system service executing on the host computer system may access functionality of a bubble, such as the bubble 112 described in conjunction with FIG. 1, to provide that functionality to a virtual machine instance executing under the control of a virtual computer system service. Similarly, other services including, the block-level data storage service 810, the cryptography service 812, the on-demand data storage service 814, the authentication system 816, the policy management service 818, and the task service 820 may also utilize the functionality of a bubble to provide that functionality to resources associated with those services. The functionality of a bubble may also be provided to customers of the computing resource service provider 802. For example, a user (e.g., the customer 804 operating a device running applications) with access to a service and/or access to resources served by that service may use the functionality of a bubble to further secure data and/or applications associated with that service. In an illustrative example, a virtual computer system service as described above and/or a virtual machine instance associated with that virtual computer system service may use the functionality of a bubble to create a bubble, provide the bubble with executable instructions and/or data, obtain keys for the bubble to encrypt results and for the virtual machine instance to decrypt the results from the bubble, and send and receive message to and from the bubble.

As another example, in some embodiments, in response to a request to create a bubble, a bubble may be created and be utilized to execute code for a customer. For example, a customer of the computing resource service provider 802 may provide code for execution in the bubble. In such a case, there may be a set of keys mutually trusted by the customer and the computing resource service provider 802 for performing integrity and providence checks on the code being provided to the bubble for execution. In some cases, the bubble may, upon creation or upon request, generate an asymmetrical key-pair in a public-private cryptographic scheme. In such a case, the bubble may provide the public key to the customer, customer virtual machine, or the computing resource service provider 802, whereupon the customer, customer virtual machine, or the computing resource service provider 802 may encrypt data for processing or instructions for execution using the provided public key and the bubble may decrypt received encrypted data or instructions using the private key held within the bubble. Alternately or additionally, the bubble may digitally sign results of processing or execution using the private key within the bubble to provide assurances to the customer, customer virtual machine, or the computing resource service provider 802 that the results have not been tampered with or forged.

Alternately or additionally, the customer, customer virtual machine, or the computing resource service provider 802 may generate an asymmetrical key-pair in a public-private cryptographic scheme and provide the bubble with the public key. After the bubble processes the data and/or executes the instructions provided to the bubble, the bubble may encrypt the results of the processing or execution using the public key before providing the results to the customer, customer virtual machine, or computing resource, whereupon the customer, customer virtual machine, or the computing resource service provider 802 may decrypt the results using the private key. In some cases, the data and/or instructions may be digitally signed by the customer, customer virtual machine, or the computing resource service provider 802 with the private key as assurance to the bubble that the data and/or instructions have not been tampered with or forged.

After the bubble completes its assigned tasks, the bubble may be held in waiting for future use by the customer either as an active instance or in some suspended mode, or may be re-assigned to a different user. Utilization of the bubble may be measured and reported for billing services or other purposes. Reports of such utilization measurements may be securely encrypted, such as using a public-private key method, such that only the computing resource service provider 802 or customer of the parent virtual machine instance or other authorized entity may examine the reports. Billing services may use the measurements to determine a bill for usage for the customer's utilization of the bubble service. In some cases, a symmetrical key-pair is shared by the bubble and the customer, customer virtual machine, and the computing resource service provider 802 for the purposes of exchanging data, instructions, and results as described.

In some embodiments, the bubble may be configured to instantiate a bootloader application within the bubble, which may, in turn, be configured to locate and/or instantiate applications and/or data to be installed within the bubble by the bootloader. A bootloader is an application, process, or module configured to locate and instantiate executable code and/or data within a computer system. The bubble may receive an encrypted bootloader from a trusted source, such as the computing resource service provider 802 or the customer of the parent virtual machine instance, decrypt the bootloader, and instantiate the bootloader within the bubble. In some embodiments, a bootloader may automatically be instantiated upon instantiation of the bubble.

Applications and/or data to be installed within the bubble by the bootloader may include any applications and/or data as may be required by the customer. In some embodiments, the applications and/or data to be installed are provided to the bubble by the customer of the parent virtual machine. In another embodiment, usable in combination with other embodiments, some applications and/or data are instantiated automatically upon instantiation of the bubble.

As noted above, a bubble a virtual machine instance for configured to secure data and/or securely execute code. The bubble includes virtual processors, such as a virtualization of one or more of a microprocessor, a co-processor, a micro-controller, a microcomputer, a central processing unit, a graphics processing unit, digital signal processor, application specific integrated circuit, custom reduced instruction set computing chip or some other programmable logic device. In some embodiments, the virtual processors of the bubble may be allocated processor scheduled time by the controlling domain. In other embodiments where the parent virtual machine instance has virtual processors with an allocation of processor scheduled time with the controlling domain, the virtual processors of the bubble may be allocated a portion of the processor scheduled time of the parent virtual machine instance. For example, if the parent virtual machine instance has a certain budget of processor scheduled time and a bubble spawned from the parent virtual machine instance, the bubble may be allocated a certain percentage, such as one percent, of the budgeted processor scheduled time of the parent virtual machine instance. In some embodiments, usable in combination with other embodiments, the bubble may use CPU stealing, that is the virtual processors of the bubble may utilize unused processor cycles of the physical processor of the host computing system for completion of assigned tasks.

The bubble further includes memory, such as random access memory (RAM), magnetic or optical disk storage, virtual memory and virtual disk storage, which can be written to and read from by the virtual processors of the bubble. In some embodiments, the bubble memory may be memory allocated by a virtual machine service hypervisor or a kernel of an operating system that allows virtualized user space instances, such as a container, exclusively for use by the bubble. In some embodiments, the bubble memory is allocated from the memory of the parent virtual machine instance. In such an embodiment, the bubble may have a memory driver in an operating system scheduler of an operating system of the bubble linked to the parent virtual machine instance for mapping the bubble memory into memory regions of the parent virtual machine instance. In some embodiments where the bubble memory is allocated from the memory of the parent virtual machine instance, the bubble memory may utilize a memory balloon driver; i.e., the bubble memory may increase or decrease based on the parent virtual machine instance's memory requirements.

For security purposes, data written to the bubble memory may be encrypted such that only the bubble memory, or entities that have been trusted with a key sufficient to decrypt the bubble memory, which may or may not include the parent virtual machine instance, controlling domain, or virtualization layer hosting the bubble, may read the encrypted bubble memory. In an embodiment where memory is shared between the parent virtual machine and the bubble, the both the bubble may read from and write to the shared memory and the parent virtual machine instance may also read from and write to the shared memory.

In some embodiments, data written to the bubble memory may not be encrypted but access to the bubble memory may be controlled by the virtualization layer hosting the bubble instead. The memory may contain instructions, that, when executed by the virtual processor, may cause data to be written to the memory, some other storage, or communicated to a trusted entity, such as a parent virtual machine instance. The executable instructions may be provided by a trusted entity, such as the parent virtual machine instance, controlling domain, or virtualization layer hosting the bubble, or the executable instructions may be instantiated into bubble memory as part of the instantiation of the bubble. The result of the execution of the instructions may be provided to the parent virtual machine instance through a message-passing interface. Possible message-passing interfaces include a virtual network connection between the bubble and the parent virtual machine instance, an application programming interface, and a data store shared between the bubble and the virtual machine instance. The result of the execution of the instructions may further be encrypted such that only the bubble and the parent virtual machine instance, or entities that have been entrusted with a key sufficient to decrypt the result, may read the decrypted result. In some embodiments, the result may not be encrypted but, rather, the virtualization component, such as the hypervisor, may ensure that only the bubble and the parent virtual machine instance, or trusted entities may read the result.

In some embodiments, the bubble may be a duplicate instance of the parent virtual machine instance, such as by using a fork virtual machine operation to create a child copy of the parent virtual machine with communication established between the child copy (i.e., the bubble) and the parent virtual machine instance. In such an embodiment, once the bubble completes its assigned task or tasks, it may be deprovisioned; in some cases, deprovisioning may be automatic whereas in other cases deprovisioning may be performed according to a command from the parent virtual machine instance. Deprovisioning a bubble may involve releasing any memory and/or resources currently allocated to the bubble, terminating any communication links to the bubble, deleting any files and/or user profiles within the bubble, and removing the bubble from the virtualization layer. In some embodiments, the bubble may have access to certain materials, devices, and/or resources which are unavailable to the parent virtual machine instance. For example, in some cases the customer owning the parent virtual machine instance may have a service plan in which the parent virtual machine instance does not run on servers supporting Intel® Software Guard eXtensions, but the service plan may allow bubbles created by the parent virtual machine instance to be instantiated on a server with Intel® Software Guard eXtensions support and the bubble may have access to of the supported Intel® extensions.

For security purposes, the bubble may communicate only with the parent virtual machine instance or the virtualization layer. In some instances the resources of the bubble may be separately allocated from the resources of the control domain such that resource usage of the bubble does not impact the control domain and vice versa. Likewise, in some embodiments, the bubble is allocated its own resources and does not compete for resources with other instances of the virtualization layer. In some instances, the bubble is utilized only for a single task or process; in such instances, the virtualization layer may schedule the bubble process to execute and, upon completion, the bubble may be subsequently deprovisioned or suspended.

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

Figure 9:
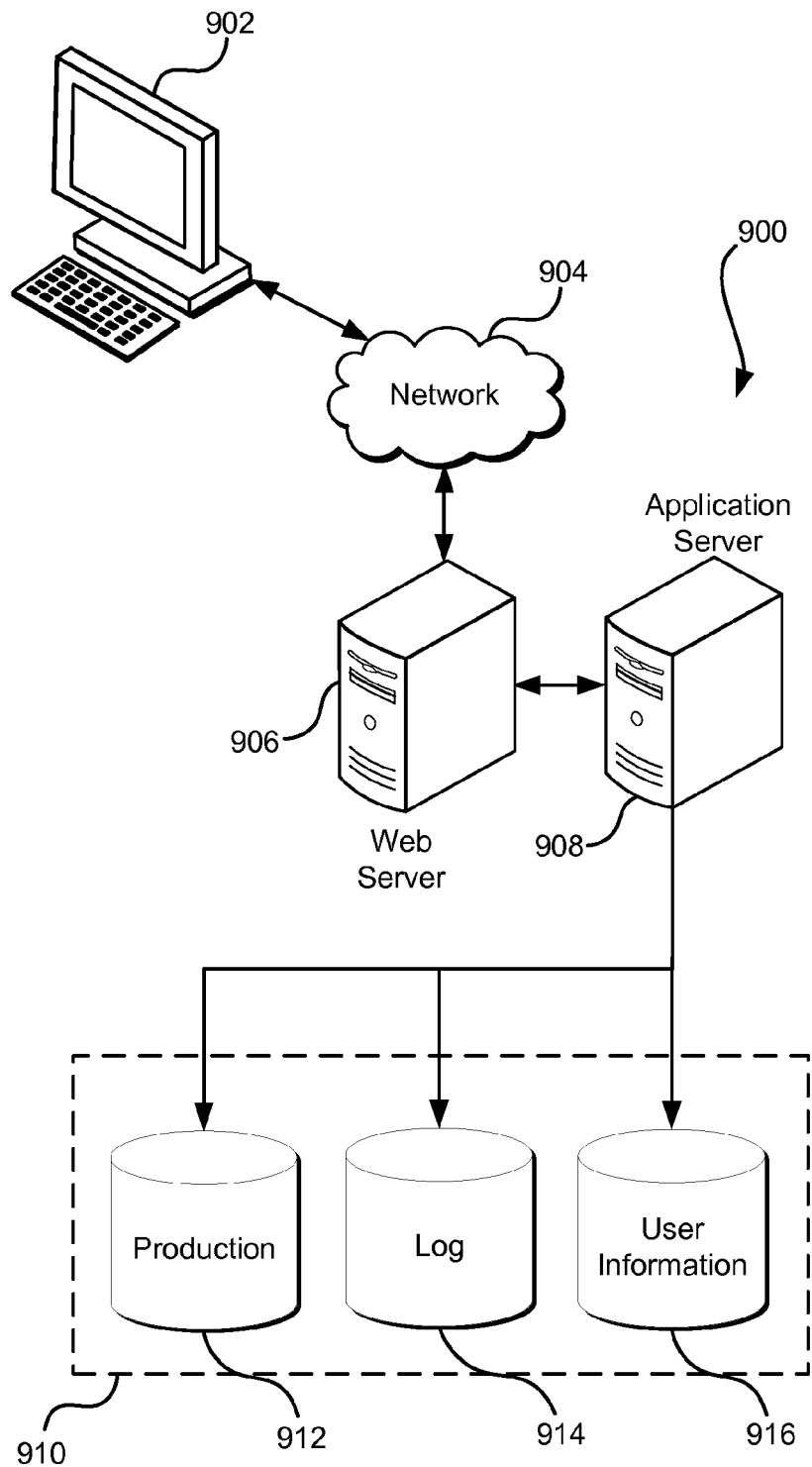
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, and a satellite network. Components used for such a system can depend in part upon the type of network and/or environment selected. Protocols and components for communicating via such a network are well known and will not be discussed in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes an application server 908 and a data store 910. It should be understood that there can be several application servers, layers or other elements, processes or components, which may be chained or otherwise configured, which can interact to perform tasks such as obtaining data from an appropriate data store. Servers may be implemented in various ways, such as hardware devices or virtual computer systems. In some contexts, servers may refer to a programming module being executed on a computer system. Unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of applications for the client device, handling some or all of the data access and business logic for an application. The application server may provide access control services in cooperation with the data store and is able to generate content including text, graphics, audio, video and/or other content usable to be provided to the user, which may be served to the user by the web server in the form of Hyper-Text Markup Language ("HTML"), Extensible Markup Language ("XML"), JavaScript, Cascading Style Sheets ("CSS") or another appropriate client-side structured language. Content transferred to a client device may be processed by the client device to provide the content in forms including forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, such as structured code, can be executed on any appropriate device or host machine as discussed elsewhere. Further, operations described as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other applications may be generated by server-side structured languages as described or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure.

The environment, in one embodiment, is a distributed and/or virtual computing environment utilizing several computer systems and components that are interconnected via communication links, using computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing web applications that may be implemented as scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad) and an output device (e.g., a display device, printer or speaker). Such a system may also include storage devices, such as disk drives, optical storage devices and solid-state storage devices such as random access memory ("RAM") or read-only memory ("ROM"), as well as removable media devices, memory cards, flash cards, etc. in which fixed instructions may be stored, and a network interface subsystem for receiving data from, and transmitting data to, other systems. Many other hardware configurations having more or fewer components than described are possible.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed. The physical components of such devices may include one or more processors, such as one or more of a microprocessor, a co-processor, a micro-controller, a microcomputer, a central processing unit, a graphics processing unit, application specific integrated circuit (ASIC), custom reduced instruction set computing (RISC) chip or some other programmable logic device, that may be configured to communicate with, and are operatively coupled to, a number of peripheral subsystems via a bus subsystem.

Storage media and computer readable media for containing code, or portions of code, can include any appropriate media known or used in the art, including storage media and communication media, such as volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of computer systems configured with executable instructions and may be implemented as code (e.g., executable instructions, computer programs or applications) executing concurrently or in series on processors, by hardware or combinations thereof. The code may be stored on a computer-readable storage medium, for example, in the form of a computer program comprising instructions executable by processors. The computer-readable storage medium may be non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications and patents, cited are incorporated by reference to the same extent as if each reference were individually and specifically indicated to be incorporated by reference and were set forth in its entirety.

What is claimed is:

1. A computer-implemented method, comprising:
   under the control of one or more computer systems that execute instructions,
   managing a primary execution environment of a computing resource service provider;
   receiving a request associated with the primary execution environment
   determining whether to create an additional execution environment to fulfill the request; and
   as a result of a determination to create the additional execution environment, fulfilling the request by at least
   creating the additional execution environment, to:
   share at least a portion of a resource that allocated to the primary execution environment;
   have virtual memory that is mapped to virtual memory of the primary execution environment, whereby:
   the primary execution environment is unable to access a portion of virtual memory that is allocated to the additional execution environment from virtual memory of the primary execution environment; and
   the additional execution environment has read and write access to the portion;
   process information communicated to the additional execution environment by the primary execution environment; and
   be inaccessible to execution environments other than the primary execution environment.

2. The computer-implemented method of claim 1, wherein the information comprises computer-executable instructions.

3. The computer-implemented method of claim 1, wherein:
   the request is a processor instruction; and
   receiving the request comprises trapping the instruction by a hypervisor.

4. The computer-implemented method of claim 1, wherein the request is an application programming interface request received over a network.

5. The computer-implemented method of claim 1, wherein the information is communicated to the additional execution environment by writing to a memory region managed by a hypervisor, the memory region being accessible to the primary execution environment and the additional execution environment.

6. A system comprising:
   one or more processors; and
   memory including instructions that, as a result of execution by the one or more processors, cause the system to:
   manage a primary execution environment of a computing resource service provider;
   receive a request from a customer of the computing resource service provider, the request associated with the primary execution environment;
   determine whether to create an additional execution environment to fulfill the request associated with the primary execution environment; and
   as a result of a determination to create the additional execution environment, fulfill the request by at least creating the additional execution environment to:
   share at least a portion of a resource allocated to the primary execution environment;
   have virtual memory that is mapped to virtual memory of the primary execution environment, whereby:
   the primary execution environment is unable to access a portion of virtual memory that is allocated to the additional execution environment from virtual memory of the primary execution environment; and
   the additional execution environment has read and write access to the portion;

process information communicated to the additional execution environment by the primary execution environment; and be inaccessible to execution environments other than the primary execution environment.

7. The system of claim 6, wherein the request that causes creation of the additional execution environment is submitted as an application programming interface request to the computing resource service provider.

8. The system of claim 6, wherein the additional execution environment is one of:
a virtual machine on a same physical machine as the primary execution environment,
an enclave in a container on the same physical machine as the primary execution environment,
a container in an enclave on the same physical machine as the primary execution environment, or
a virtual machine in an enclave on the same physical machine as the primary execution environment.

9. The system of claim 6, wherein the additional execution environment is one of:
a virtual machine on a different physical machine as the primary execution environment,
an enclave in a container on a different physical machine as the primary execution environment,
a container in an enclave on a different physical machine as the primary execution environment, or
a virtual machine in an enclave on a different physical machine as the primary execution environment.

10. The system of claim 6, wherein:
the additional execution environment has a cryptographic key usable to decrypt the information communicated to the additional execution environment by the primary execution environment; and
the cryptographic key is inaccessible to the primary execution environment.

11. The system of claim 6, wherein the information includes a first executable instruction and the additional execution environment at least:
converts the first executable instruction to a second executable instruction; and
executes the second executable instruction.

12. The system of claim 6, wherein:
the information includes one or more instructions; and
the additional execution environment communicates, to the primary execution environment, a result of processing the one or more instructions.

13. The system of claim 6, wherein:
the primary execution environment is on a separate physical device than the additional execution environment; and
the request is an application programming interface request received over a network.

14. The system of claim 6, wherein the instructions further comprise instructions that cause the system to grant, to the additional execution environment, access to a resource of the primary execution environment.

15. The system of claim 6, wherein the instructions further comprise instructions that cause the system to provide access to the additional execution environment to additional resources, wherein the primary execution environment has insufficient privileges to access the additional resources.

16. The system of claim 6, wherein the instructions that cause the system to create the additional execution environment further include instructions that cause the system to create the additional execution environment as a copy of the primary execution environment.

17. The system of claim 6, wherein the request is received from a different computer system than a computer system hosting the primary execution environment.

18. The system of claim 6, wherein the additional execution environment can read from a virtual memory of the primary execution environment, but is unable to modify the virtual memory of the primary execution environment.

19. The system of claim 6, wherein the instructions that cause the system to manage the primary execution environment include instructions that cause the system to implement a hypervisor that manages the primary execution environment.

20. The system of claim 19, wherein the hypervisor operates on a physical processor with a secure execution environment and wherein the additional execution environment is created to execute in the secure execution environment of the physical processor.

21. The system of claim 9, wherein, the additional execution environment lacks access to one or more peripheral devices in a set of virtual peripheral devices provided by the hypervisor.

22. The system of claim 19, wherein the hypervisor allocates compute resources to a virtual processor of the additional execution environment based at least in part on an allocation of compute resources made to a virtual processor of the primary execution environment.

23. The system of claim 6, wherein an amount of the virtual memory of the additional execution environment that is mapped to the virtual memory of the primary execution environment is based at least in part on an amount of virtual memory in use by the primary execution environment.

24. A non-transitory computer-readable storage medium having stored thereon executable instructions that, as a result of execution by one or more processors of a computer system, cause the computer system to at least:
manage a primary execution environment of a computing resource service provider;
receive a request associated with the primary execution environment;
determine whether to create an additional execution environment to fulfill the request; and
as a result of a determination to create the additional execution environment, fulfill the request by causing the computer system to at least create the additional execution environment to:
share at least a portion of a resource that has been allocated to the primary execution environment;
have virtual memory that is mapped to virtual memory of the primary execution environment, whereby:
the primary execution environment is unable to access a portion of virtual memory that is allocated to the additional execution environment from virtual memory of the primary execution environment; and
the additional execution environment has read and write access to the portion;
process information communicated to the additional execution environment by the primary execution environment; and
be inaccessible to execution environments other than the primary execution environment.

25. The non-transitory computer-readable storage medium of claim 24, wherein the request is a hypercall that is trapped by a hypervisor.

26. The non-transitory computer-readable storage medium of claim 24, wherein the request is submitted as an application programming interface request to the computing resource service provider.

27. The non-transitory computer-readable storage medium of claim 24, wherein:
- the additional execution environment has a cryptographic key usable to decrypt the information communicated to the additional execution environment by the primary execution environment; and
- the cryptographic key is inaccessible to the primary execution environment.

* * * * *